US012487545B2

(12) United States Patent
Adachi et al.

(10) Patent No.: US 12,487,545 B2
(45) Date of Patent: Dec. 2, 2025

(54) HEATING DEVICE INCLUDING A LUBRICANT HOLDING REGION, A FIXING DEVICE INCLUDING THE SAME, AND AN IMAGE FORMING APPARATUS INCLUDING THE SAME

(71) Applicants: Tomoya Adachi, Kanagawa (JP); Yuusuke Furuichi, Kanagawa (JP); Yukimichi Someya, Saitama (JP)

(72) Inventors: Tomoya Adachi, Kanagawa (JP); Yuusuke Furuichi, Kanagawa (JP); Yukimichi Someya, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/718,633

(22) PCT Filed: Jan. 24, 2023

(86) PCT No.: PCT/IB2023/050564
§ 371 (c)(1),
(2) Date: Jun. 11, 2024

(87) PCT Pub. No.: WO2023/166360
PCT Pub. Date: Sep. 7, 2023

(65) Prior Publication Data

US 2025/0044728 A1 Feb. 6, 2025

(30) Foreign Application Priority Data

Mar. 3, 2022 (JP) ................................ 2022-032745
Jun. 1, 2022 (JP) ................................ 2022-089587

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
USPC ........................................................ 399/325
See application file for complete search history.

(56) References Cited

U.S. PATENT DOCUMENTS

2003/0170054 A1 9/2003 Suzuki et al.
2012/0230742 A1 9/2012 Nakagawa et al.
(Continued)

FOREIGN PATENT DOCUMENTS

JP 2005173441 A 6/2005
JP 2006235550 A 9/2006
(Continued)

OTHER PUBLICATIONS

International Search Report and Written Opinion issued on Mar. 27, 2023 in PCT/IB2023/050564 filed on Jan. 24, 2023.

*Primary Examiner* — Quana Grainger
(74) *Attorney, Agent, or Firm* — Harness, Dickey & Pierce, P.L.C.

(57) ABSTRACT

A heating device includes a rotator, a pressure rotator, a heater, a holder, and lubricant. The heater inside the rotator forms a sliding nip between the rotator and the heater. The heater includes a resistive heat generator inside the sliding nip. The lubricant is applied to the inner surface of the rotator and a sliding surface of the heater. The lubricant is held in a lubricant holding region outside the sliding nip and between the rotator and the heater. An application quantity P of the lubricant satisfies the following.

$$A \times X1 \times B \times C \leq P \leq D \times C$$

where A is a height of irregularities on the inner surface of the rotator, X1 is a longitudinal length of the rotator, B is a circumferential length of the rotator, C is a specific weight of the lubricant, and D is a volume of the lubricant holding region.

20 Claims, 15 Drawing Sheets

(56) References Cited

U.S. PATENT DOCUMENTS

| | | | |
|---|---|---|---|
| 2012/0275831 | A1 | 11/2012 | Ishida et al. |
| 2020/0209787 | A1* | 7/2020 | Taniguchi .......... G03G 15/2025 |
| 2020/0409292 | A1 | 12/2020 | Fujimoto et al. |
| 2021/0157257 | A1 | 5/2021 | Imaizumi |
| 2022/0382191 | A1 | 12/2022 | Furuichi et al. |
| 2023/0004108 | A1 | 1/2023 | Furuichi et al. |
| 2023/0185222 | A1 | 6/2023 | Furuichi et al. |
| 2023/0205118 | A1 | 6/2023 | Ishigaya et al. |

FOREIGN PATENT DOCUMENTS

| | | | |
|---|---|---|---|
| JP | 2010204587 | A | 9/2010 |
| JP | 2011191691 | A | 9/2011 |
| JP | 2013064916 | A | 4/2013 |
| JP | 2015118365 | A | 6/2015 |
| JP | 2023069406 | A | 5/2023 |

* cited by examiner

HEATING DEVICE INCLUDING A LUBRICANT HOLDING REGION, A FIXING DEVICE INCLUDING THE SAME, AND AN IMAGE FORMING APPARATUS INCLUDING THE SAME

CROSS-REFERENCE TO RELATED APPLICATIONS

This application is a national phase entry under 35 U.S.C. § 371 of PCT International Application No. PCT/IB2023/050564 which has an International filing date of Jan. 24, 2023, which claims priority to Japanese Application Nos. 2022-032745, filed Mar. 3, 2022, and 2022-089587, filed Jun. 1, 2022, the entire contents of each of which are hereby incorporated by reference.

TECHNICAL FIELD

Embodiments of the present disclosure relate to a heating device, a fixing device, and an image forming apparatus.

BACKGROUND ART

An electrophotographic image forming apparatus includes a fixing device. One type of fixing device includes a fixing rotator such as a rotatable endless fixing belt and a heater such as a planar heater disposed inside a loop of the fixing belt to heat the fixing belt. The above-described fixing device includes lubricant applied to an inner circumferential surface of the fixing belt to reduce a sliding friction between the fixing belt and the heater.

In the above-described fixing device, an appropriate amount of lubricant is interposed between the fixing belt and the heater to prevent wear of the fixing belt and maintain a driving torque of a pressure roller driving the fixing belt at an appropriate value. For example, Japanese Unexamined Patent Application Publication No. 2010-204587 discloses the fixing device including the fixing belt having a rough surface on a center portion of the inner circumferential surface in a rotational axial direction of the fixing belt. The rough surface improves the ability of the fixing belt to retain the lubricant.

CITATION LIST

Patent Literature

[PTL 1]

Japanese Unexamined Patent Application Publication No. 2010-204587

SUMMARY OF INVENTION

Technical Problem

The configuration disclosed in Japanese Unexamined Patent Application Publication No. 2010-204587 cannot hold the appropriate amount of lubricant between the fixing rotator and the heater in some cases depending on the application amount of the lubricant, the structure of the heater, and the structure of the holder holding the heater. An object of the present disclosure is providing a good sliding state between a rotator and a heater.

Solution to Problem

According to embodiments of the present disclosure, a heating device includes a rotator, a pressure rotator, a heater, a holder, and lubricant. The pressure rotator forms an outer surface nip between the rotator and the pressure rotator. The heater is disposed inside a loop of the rotator and forms a sliding nip between an inner circumferential surface of the rotator and the heater. The heater includes a base and a resistive heat generator disposed inside the sliding nip in a recording medium conveyance direction. The holder has a recessed portion to hold the heater. The lubricant is applied to the inner circumferential surface of the rotator and a sliding surface of the heater on which the rotator slides. The lubricant is held in a lubricant holding region outside the sliding nip in the recording medium conveyance direction and between the rotator and the heater. An application quantity P of the lubricant satisfies the following expression.

$$A \times X1 \times B \times C \leq P \leq D \times C$$

where A is a height of irregularities on the inner circumferential surface of the rotator, ×1 is a length of the rotator in the longitudinal direction, B is a circumferential length of the rotator, C is a specific weight of the lubricant, and D is a volume of the lubricant holding region.

Advantageous Effects of Invention

The present disclosure can provide a good sliding state between a rotator and a heater.

BRIEF DESCRIPTION OF DRAWINGS

A more complete appreciation of the embodiments and many of the attendant advantages and features thereof can be readily obtained and understood from the following detailed description with reference to the accompanying drawings

Figure 1:
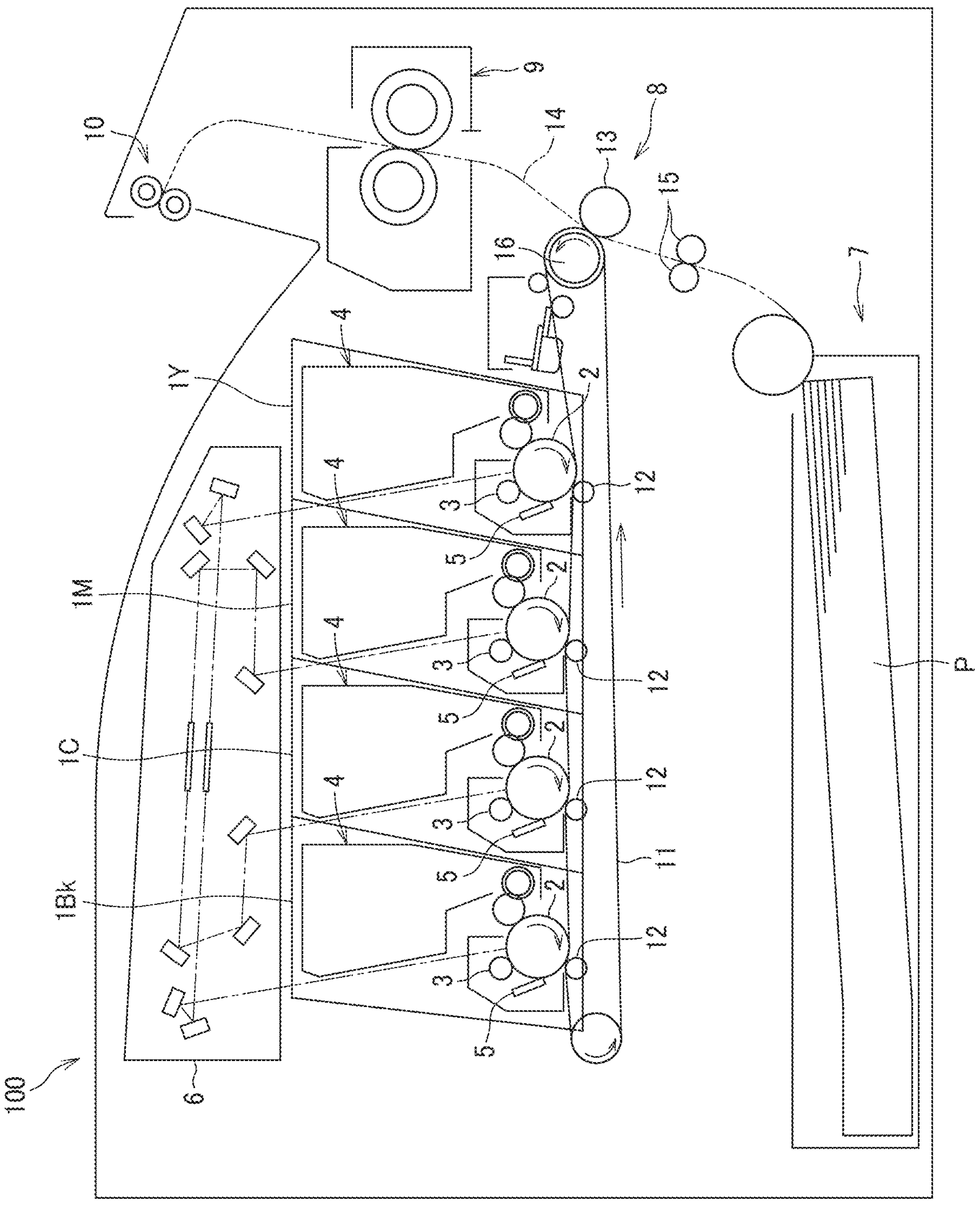
FIG. 1 is a schematic cross-sectional view of an image forming apparatus according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise. In the drawings illustrating the following embodiments, the same reference numbers are allocated to elements having the same function or shape and redundant descriptions thereof are omitted below.

FIG. 1 is a schematic sectional view of an image forming apparatus 100 according to an embodiment of the present disclosure. The image forming apparatus 100 according to the present embodiment includes a fixing device as an example of a heating device of the present disclosure. The fixing device fixes a toner image on a sheet onto the sheet.

The image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form the toner image. The cleaning device 5 cleans the surface of the photoconductor 2.

The image forming apparatus 100 includes an exposure device 6, a sheet feeder 7, a transfer device 8, a fixing device 9 as the heating device, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk, photoconductors 2, the charging devices 3, the exposure device 6, the transfer device 8, and the like configure an image forming device that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched by a plurality of rollers. Each of the four primary transfer rollers 12 transfers the toner image from each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip between the intermediate transfer belt 11 and each of the photoconductors 2.

The secondary transfer roller 13 contacts, via the intermediate transfer belt 11, one of the plurality of rollers around which the intermediate transfer belt 11 is stretched. Thus, the secondary transfer nip is formed between the secondary transfer roller 13 and the intermediate transfer belt 11.

A timing roller pair 15 is disposed between the sheet feeder 7 and the secondary transfer nip defined by the secondary transfer roller 13 in the sheet conveyance path 14.

Referring to FIG. 1, a description is provided of printing processes performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from a terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip defined by each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip so that the sheet P meets the full color toner image formed on the intermediate transfer belt 11 at the secondary transfer nip. Thus, the full color toner image is transferred onto and borne on the sheet P. After the toner image is transferred from each of the photoconductors 2 onto the intermediate transfer belt 11, each of cleaning devices 5 removes residual toner on each of the photoconductors 2.

After the full color toner image is transferred onto the sheet P, the sheet P is conveyed to the fixing device 9 to fix the full color toner image onto the sheet P. Thereafter, the sheet ejection device 10 ejects the sheet P onto the outside of the image forming apparatus 100, thus finishing a series of printing processes.

Next, a configuration of the fixing device 9 is described.

Figure 2:
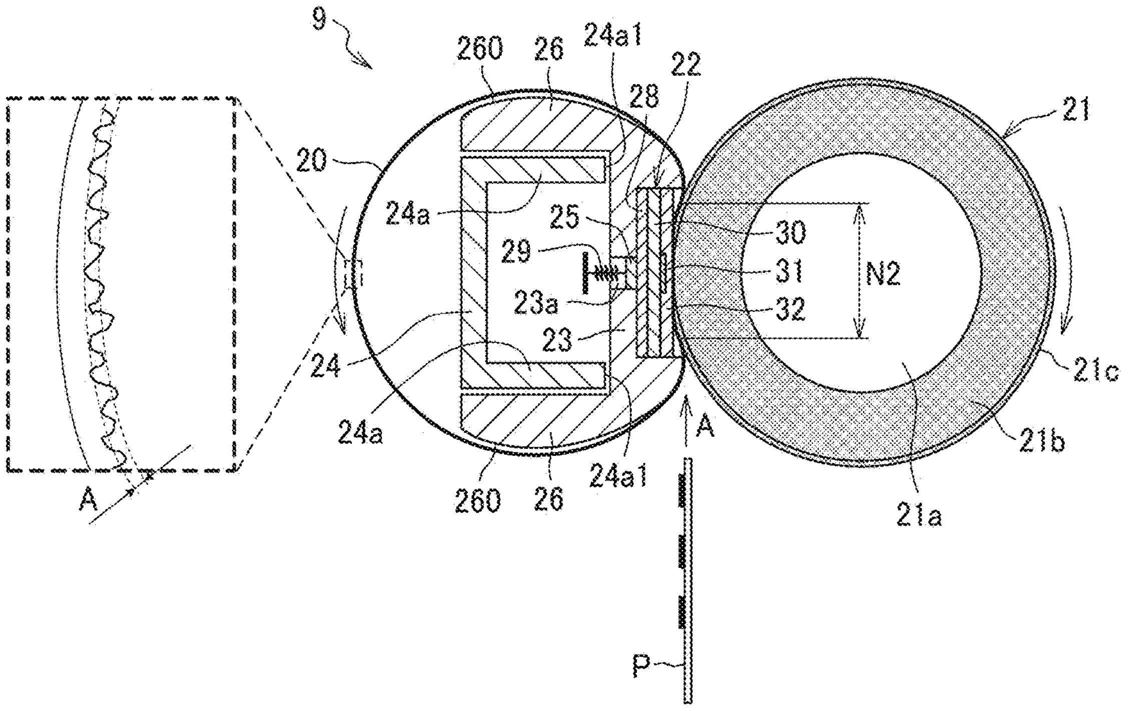
FIG. 2 is a schematic sectional side view of a fixing device incorporated in the image forming apparatus of FIG. 1 and an enlarged partial sectional view of a fixing belt.

As illustrated in FIG. 2, the fixing device 9 according to the present embodiment includes a fixing belt 20, a pressure roller 21, a heater 22 as a heating member, a heater holder 23 as a holder, a stay 24 as a support, a thermistor 25 as a temperature detector, and a first high thermal conduction member 28. The fixing belt 20 is an endless belt. The pressure roller 21 is in contact with the outer circumferential surface of the fixing belt 20 to form a fixing nip N2 as an outer surface nip portion between the pressure roller 21 and the fixing belt 20. The heater 22 heats the fixing belt 20. The heater holder 23 holds the heater 22. The stay 24 supports the heater holder 23. The thermistor 25 detects the temperature of the first high thermal conduction member 28.

A direction perpendicular to the sheet surface of FIG. 2 is a longitudinal direction of the fixing belt 20, the pressure roller 21 as a pressure rotator, the heater 22, the heater holder 23, the stay 24, and the first high thermal conduction member 28. Hereinafter, the direction is simply referred to as the longitudinal direction. Note that the longitudinal direction is also a width direction of the sheet P conveyed, a belt width direction of the fixing belt 20, and an axial direction of the pressure roller 21. A fixing rotator disposed in the fixing device is an aspect of a rotator disposed in the heating device of the present disclosure. The fixing device 9 in the present embodiment includes the fixing belt 20 as an example of the fixing rotator. A direction indicated by an arrow A in FIG. 2 is a sheet conveyance direction as a recording medium direction.

The fixing belt 20 includes a tubular base that is made of polyimide (PI) and has an outer diameter of 25 mm and a thickness in a range of from 50 μm to 75 μm, for example. The fixing belt 20 further includes a release layer serving as an outermost surface layer. The release layer is made of fluororesin, such as tetrafluoroethylene-perfluoroalkylvinylether copolymer (PFA) and polytetrafluoroethylene (PTFE) and has a thickness in a range of from 7 μm to 20 μm to enhance durability of the fixing belt 20 and facilitate separation of the sheet P and a foreign substance from the fixing belt 20. Optionally, an elastic layer that is made of rubber or the like and has a thickness in a range of from 100 μm to 300 μm may be interposed between the base and the release layer. The base of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with PI or PTFE as a slide layer.

The pressure roller 21 has, for example, an outer diameter of 20 to 22 mm. The pressure roller 21 includes a core 21*a*, an elastic layer 21*b* on the core 21*a*, and a surface layer 21*c* on the elastic layer 21*b*. The core 21*a* is a solid core made of a conductive material that is iron in the present embodiment. The elastic layer 21*b* is made of a non-conductive material that is silicone rubber in the present embodiment. The elastic layer 21*b* has a thickness of 3.5 mm to 4.0 mm. Forming the elastic layer 21*b* as a non-conductive layer does not need adding a material such as a filler to the elastic layer 21*b* for imparting conductivity to the elastic layer 21*b*, which is helpful to secure the elasticity and stretchability of the elastic layer 21*b*. The surface layer 21*c* is made of fluororesin and has a thickness of 30 μm to 50 μm.

The pressure roller 21 is biased toward the fixing belt 20 by a biasing member and pressed against the heater 22 via the fixing belt 20. Thus, the fixing nip N2 is formed between the fixing belt 20 and the pressure roller 21. A driver drives and rotates the pressure roller 21 in a direction indicated by an arrow in FIG. 2, and the rotation of the pressure roller 21 rotates the fixing belt 20.

The heater 22 is a planar heater extending in the longitudinal direction thereof parallel to the width direction of the fixing belt 20. The heater 22 includes a planar base 30, resistive heat generators 31 disposed on the base 30, and an insulation layer 32 covering the resistive heat generators 31. The insulation layer 32 of the heater 22 contacts the inner circumferential surface of the fixing belt 20, and the heat generated by the resistive heat generators 31 is transmitted to the fixing belt 20 through the insulation layer 32. The heater 22 may be covered with a conductor such as a sliding sheet, and the sliding sheet may contact the inner circumferential surface of the fixing belt 20. In the present disclosure, contact between the heater 22 and the inner circumferential surface of the fixing belt 20 may include contact between the heater 22 and the fixing belt 20 via the conductor. A power supply 200 (see FIG. 4) applies an alternating current (AC) voltage to the heater 22, and the resistive heat generators 31 mainly generate heat. Although the resistive heat generators 31 and the insulation layer 32 are disposed on the side of the base 30 facing the fixing belt 20 (that is, the fixing nip N2) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with the material with high thermal conductivity enables to sufficiently heat the fixing belt 20 even if the resistive heat generators 31 are disposed on the side of the base 30 opposite to the side facing the fixing belt 20.

The heater holder 23 and the stay 24 are disposed inside a loop of the fixing belt 20. The stay 24 is configured by a channeled metallic member, and both side plates of the fixing device 9 support both end portions of the stay 24. Since the stay 24 supports the heater holder 23 and the heater 22, the heater 22 reliably receives a pressing force of the pressure roller 21 pressed against the fixing belt 20. Thus, the fixing nip N2 is stably formed between the fixing belt 20 and the pressure roller 21. In the present embodiment, the thermal conductivity of the heater holder 23 is set to be smaller than the thermal conductivity of the base 30.

Since the heater holder 23 is heated to a high temperature by heat from the heater 22, the heater holder 23 is preferably made of a heat resistant material. The heater holder 23 made of heat-resistant resin having low thermal conduction, such as a liquid crystal polymer (LCP), reduces heat transfer from the heater 22 to the heater holder 23. Thus, the heater 22 can effectively heat the fixing belt 20.

In addition, the heater holder 23 includes guides 26 to guide the fixing belt 20. The guides 26 include upstream guides upstream from the heater 22 (that is under the heater 22 in FIG. 2) and downstream guides downstream from the heater 22 (that is over the heater 22 in FIG. 2) in a rotation direction of the fixing belt 20. The upstream guides and the downstream guides of the guides 26 are disposed at intervals in the longitudinal direction of the heater 22. Each guide 26 has a substantial fan shape and has a belt facing surface 260. The belt facing surface 260 faces the inner circumferential surface of the fixing belt 20 and is an arc-shaped or convex curved surface extending in a belt circumferential direction.

The heater holder 23 has a plurality of openings **23*a* arranged in the longitudinal direction. The openings 23*a* extend through the heater holder 23 in the thickness direction thereof. The thermistor 25 and a thermostat which is described later are disposed in the openings 23*a*. Springs 29 press the thermistor 25 and the thermostat against the back surface of the first high thermal conduction member 28. However, the first high thermal conduction member 28 (and a second high thermal conduction member described later) may have openings similar to the openings 23*a*, and the springs 29 may press the thermistor 25 and the thermostat against the back surface of the base 30**.

The first high thermal conduction member 28 is made of a material having a thermal conductivity higher than a thermal conductivity of the base 30. In the present embodiment, the first high thermal conduction member 28 is a plate made of aluminum. Alternatively, the first high thermal conduction member 28 may be made of copper, silver, graphene, or graphite, for example. The first high thermal conduction member 28 that is the plate can improve accuracy of positioning of the heater 22 with respect to the heater holder 23 and the first high thermal conduction member 28.

Next, a method of calculating the thermal conductivity is described. In order to calculate the thermal conductivity, the thermal diffusivity of a target object is firstly measured. Using the thermal diffusivity, the thermal conductivity is calculated.

The thermal diffusivity was measured using a thermal diffusivity/conductivity measuring device (trade name: AI-PHASE MOBILE 1U, manufactured by Ai-Phase co., ltd.).

In order to convert the thermal diffusivity into thermal conductivity, values of density and specific heat capacity are necessary. The density was measured by a dry automatic densitometer (trade name: ACCUPYC 1330 manufactured by Shimadzu Corporation). The specific heat capacity was measured by a differential scanning calorimeter (trade name: DSC-60 manufactured by Shimadzu Corporation), and sapphire was used as a reference material in which the specific heat capacity is known. In the present embodiment, the specific heat capacity was measured five times, and an average value was calculated and used to obtain the thermal conductivity. A temperature condition was 50° C. The thermal conductivity λ is obtained by the following expression (1).

$$\lambda=\rho\times C\times\alpha. \quad (1)$$

where ρ is the density, C is the specific heat capacity, and α is the thermal diffusivity obtained by the thermal diffusivity measurement described above.

When the fixing device 9 according to the present embodiment starts printing, the pressure roller 21 is driven to rotate, and the fixing belt 20 starts to be rotated. The belt facing surface 260 of the guide 26 contacts and guides the inner circumferential surface of the fixing belt 20 to rotate the fixing belt 20 stably and smoothly. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed to the fixing nip N2 between the fixing belt 20 and the pressure roller 21, and the unfixed toner image is heated and pressed to be fixed to the sheet P. The fixing belt 20 is a heated member heated by the heater 22.

Next, a configuration of the heater disposed in the above-described fixing device is described.

Figure 3:
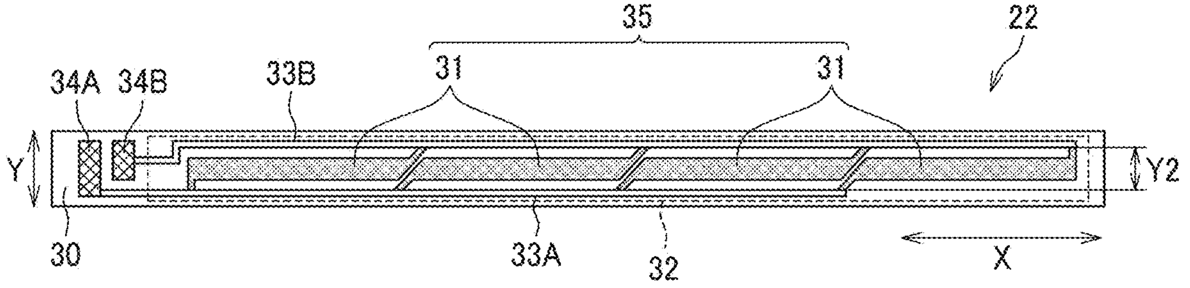
FIG. 3 is a plan view of a heater.

FIG. 3 is a plan view of the heater according to the present embodiment.

As illustrated in FIG. 3, the heater 22 includes the planar base 30. On the surface of the base 30, a plurality of resistive heat generators 31 (four resistive heat generators 31), power supply lines 33A and 33B that are conductors, a first electrode 34A, and a second electrode 34B are disposed. However, the number of resistive heat generators 31 is not limited to four in the present embodiment.

A lateral direction X in FIG. 3 is the longitudinal direction of the heater 22 and the like as described above and is also an arrangement direction of the plurality of resistive heat generators 31. The arrangement direction is the same direction as the longitudinal direction of the fixing belt 20 and the axial direction of the pressure roller 21. A vertical direction Y in FIG. 3 is a sheet conveyance direction as a recording medium conveyance direction. In addition, the vertical direction Y in FIG. 3 is also a short-side direction of the heater 22. The vertical direction Y is a direction that intersects the arrangement direction in which the resistive heat generators 31 are arranged (that is a direction perpendicular to the arrangement direction in the present embodiment) and is different from a thickness direction of the base 30. Hereinafter, the lateral direction X is simply referred to as the longitudinal direction, and the vertical direction Y is simply referred to as the short-side direction.

The plurality of resistive heat generators 31 configure a plurality of heat generation portions 35 divided in the longitudinal direction. The resistive heat generators 31 are electrically coupled in parallel to a pair of electrodes 34A and 34B disposed on one end of the base 30 in the longitudinal direction (that is a left end of the base 30 in FIG. 3) via the power supply lines 33A and 33B. The power supply lines 33A and 33B are made of conductors having an electrical resistance value smaller than an electrical resistance value of the resistive heat generator 31. A gap area between neighboring resistive heat generators 31 is preferably 0.2 mm or more, more preferably 0.4 mm or more from the viewpoint of maintaining the insulation between the neighboring resistive heat generators 31. If the gap area between the neighboring resistive heat generators 31 is too large, the gap area is likely to cause temperature decrease in the gap area. Accordingly, from the viewpoint of reducing the temperature unevenness in the longitudinal direction, the gap area is preferably equal to or shorter than 5 mm, and more preferably equal to or shorter than 1 mm.

The resistive heat generator 31 is made of a material having a positive temperature coefficient (PTC) of resistance that is a characteristic that the resistance value increases (the heater output decreases) as the temperature T increases. The temperature coefficient of resistance of the resistive heat generator 31 is set to, for example, 500 ppm.

Dividing the heat generation portion 35 configured by the resistive heat generators 31 having the PTC characteristic in the longitudinal direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 outside the small sheet increases because the small sheet does not absorb heat of the fixing belt 20 in the region outside the small sheet that is the region outside the width of the small sheet. Since a constant voltage is applied to the resistive heat generators 31, the increase in resistance values of the resistive heat generators 31 caused by the temperature increase in the regions outside the width of the small sheets relatively reduces outputs (heat generation amounts) of the resistive heat generators 31 in the regions, thus restraining an increase in temperature in the regions that are end portions of the fixing belt outside the small sheets. Electrically coupling the plurality of resistive heat generators 31 in parallel can restrain temperature rises in non-sheet passing regions while maintaining the print speed. Heat generators that configure the heat generation portion 35 may not be the resistive heat generators each having the PTC characteristic. The resistive heat generators in the heater 22 may be arranged in a plurality of rows arranged in the short-side direction.

The resistive heat generators 31 are produced, for example, as below. Silver-palladium (AgPd), glass powder, and the like are mixed to make paste. The paste is coated to the base 30 by screen printing or the like. Thereafter, the base 30 is subject to firing. Then, the resistive heat generators 31 are produced. The resistive heat generators 31 each have a resistance value of 80Ω at room temperature, in the present embodiment. The material of the resistive heat generators 31 may contain a resistance material, such as silver alloy (AgPt) or ruthenium oxide ($RuO_2$), other than the above material. Silver (Ag) or silver palladium (AgPd) may be used as a material of the power supply lines 33A and 33B and the electrodes 34A and 34B. Screen-printing such a material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment includes an alumina base having a thickness of 1.0 mm, a length of 270 mm in the longitudinal direction, and a width of 8 mm in the short-side direction. Alternatively, the base 30 may be made by layering the insulation material on conductive material such as metal. Low-cost aluminum or stainless steel is favorable as the metal material of the base 30. The base 30 made of a stainless steel plate is resistant to cracking due to thermal stress. To improve thermal uniformity of the heater 22 and image quality, the base 30 may be made of a material having high thermal conductivity, such as copper, graphite, or graphene.

The insulation layer 32 may be, for example, a thermal resistance glass having a thickness of 75 μm. The insulation layer 32 covers the resistive heat generators 31 and the power supply lines 33A and 33B to insulate and protect the resistive heat generators 31 and the power supply lines 33A and 33B and maintain sliding performance with the fixing belt 20.

Figure 4:
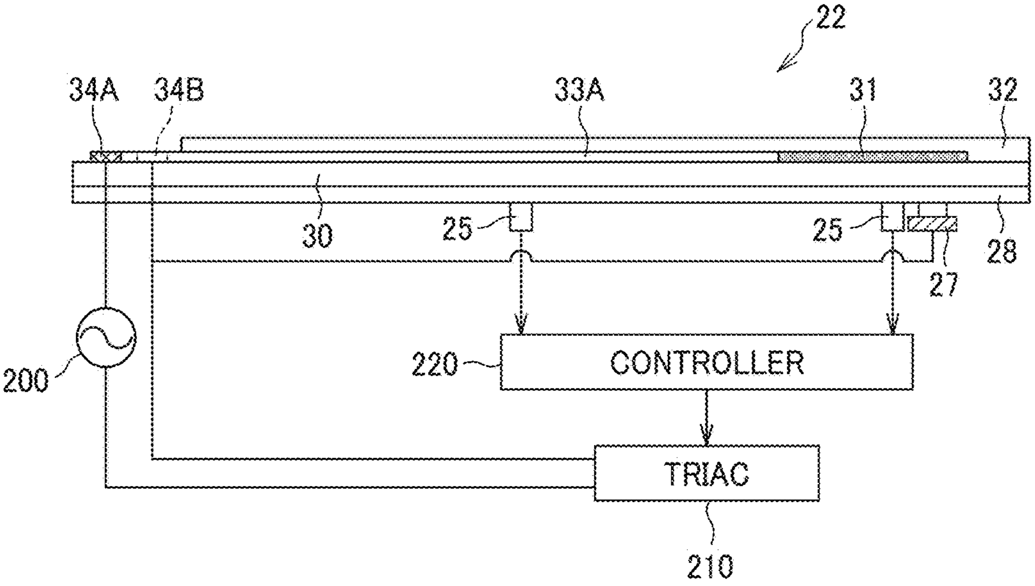
FIG. 4 is a schematic diagram illustrating a circuit to supply power to the heater of FIG. 3.

FIG. 4 is a schematic diagram illustrating a circuit to supply power to the heater according to the present embodiment.

As illustrated in FIG. 4, the alternating current power supply 200 is electrically coupled to the electrodes 34A and 34B of the heater 22 to configure a power supply circuit in the present embodiment to supply power to the resistive heat generators 31. The power supply circuit includes a triac 210 that controls an amount of power supplied. A controller 220 controls the amount of power supplied to the resistive heat generators 31 via the triac 210 based on temperatures detected by the thermistors 25. The controller 220 includes a microcomputer including, for example, a central processing unit (CPU), a read only memory (ROM), a random access memory (RAM), and an input and output (I/O) interface.

In the present embodiment, one thermistor 25 is disposed in the central region of the heater 22 in the longitudinal direction that is the region inside a sheet conveyance span for the smallest sheet, and the other thermistor 25 is disposed in one end portion of the heater 22 in the longitudinal direction. A thermostat 27 as a power cut-off device is disposed in the one end portion of the heater 22 in the longitudinal direction and cuts off power supply to the resistive heat generators 31 when the temperature of the resistive heat generator 31 becomes a predetermined temperature or higher. The thermistors 25 and the thermostat 27 contact the first high thermal conduction member 28 to detect the temperature of the first high thermal conduction member 28.

Figure 5:
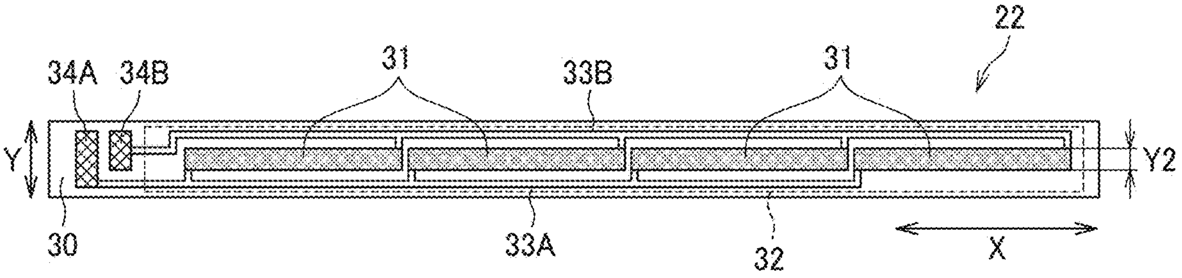
FIG. 5 is a plan view of a heater including resistive heat generators each having a form different from a form of a resistive heat generator illustrated in FIG. 3.
Figure 6:
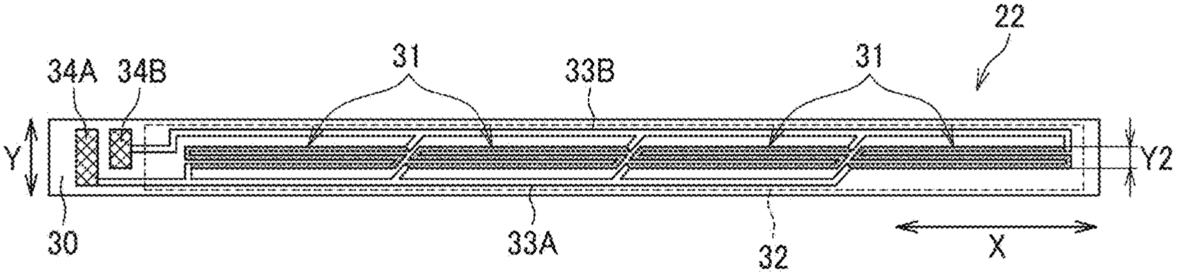
FIG. 6 is a plan view of a heater including resistive heat generators each having a form different from each of the forms of the resistive heat generators illustrated in FIGS. 3 and 5.

The first electrode 34A and the second electrode 34B are disposed on the same end portion of the base 30 in the longitudinal direction in the present embodiment but may be disposed on both end portions of the base 30 in the longitudinal direction. The shape of resistive heat generator 31 is not limited to the shape in the present embodiment. As illustrated in FIG. 5, the shape of resistive heat generator 31 may be a rectangular shape, or as illustrated in FIG. 6, the resistive heat generator 31 may be configured by a linear portion folding back to form a substantially parallelogram shape. In addition, as illustrated in FIG. 5, portions each extending from the resistive heat generator 31 having a rectangular shape to one of the power supply lines 33A and 33B (the portion extending in the short-side direction) may be a part of the resistive heat generator 31 or may be made of the same material as the power supply lines 33A and 33B.

Figure 7:
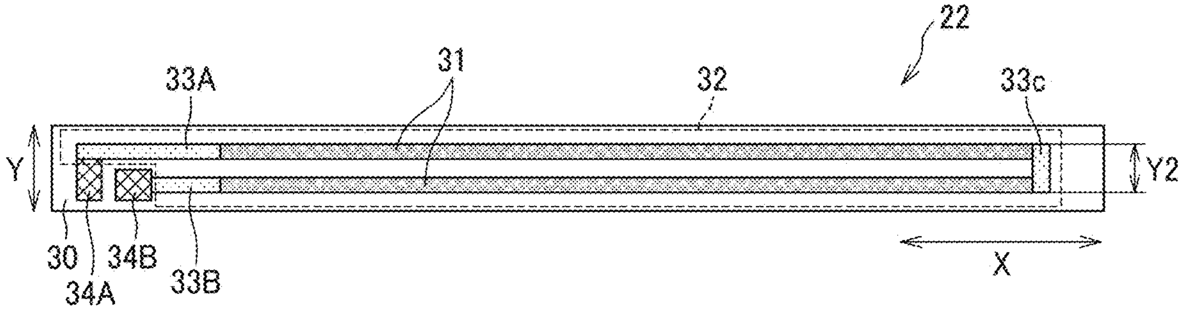
FIG. 7 is a plan view of a heater including resistive heat generators each having a form different from each of the forms of the resistive heat generators illustrated in FIGS. 3, 5, and 6.

The heater 22 may have a configuration not including the resistive heat generators 31 forming the heat generation portions 35 divided in the longitudinal direction. For example, as illustrated in FIG. 7, the heater 22 may be configured by two resistive heat generators 31 extending in the longitudinal direction and coupled in series. Ends of the two resistive heat generators 31 in the longitudinal direction are coupled to the electrodes 34A and 34B via power supply lines 33A and 33B, respectively. The other ends of the two resistive heat generators 31 in the longitudinal direction are coupled in series via a power supply line 33C.

The following describes the heater 22 illustrated in FIG. 7 as an example. In the short-side direction Y, parts of the heater 22 have following widths. The width of the base 30 is 8.0 mm. The width of each of the resistive heat generators 31 is 1.5 mm. The gap between the resistive heat generators 31 is 0.8 mm. A width Y2 of a heating region of the heater 22 in the short-side direction is 3.8 mm. The heating region of the heater 22 is a main heat generation area of the heater 22 and is a region including the resistive heat generators 31 in the heater 22. In addition, the heating region includes the gap between the resistive heat generators 31.

Figure 8:
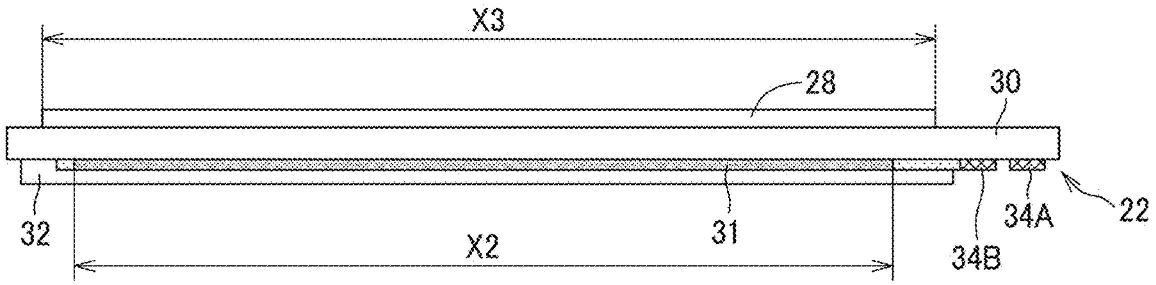
FIG. 8 is a view of a heater and a first high thermal conduction member illustrating lengths of the heater and the first high thermal conduction member in a longitudinal direction thereof.

As illustrated in FIG. 8, a length X2 of the heating region of the heater in the longitudinal direction is set to 216 mm. The first high thermal conduction member 28 is designed to have a thickness of 0 3 mm, a length X3 of 222 mm in the longitudinal direction, and a width of 10 mm in the short-side direction. The longitudinal length X3 of the first high thermal conduction member 28 is longer than the longitudinal length X2 of the heating region of the heater. The above-described configuration prevents occurrence of a crack in the heater 22 caused by an excessive temperature rise at a local position of the resistive heat generator 31 in the heater 22.

Figure 9:
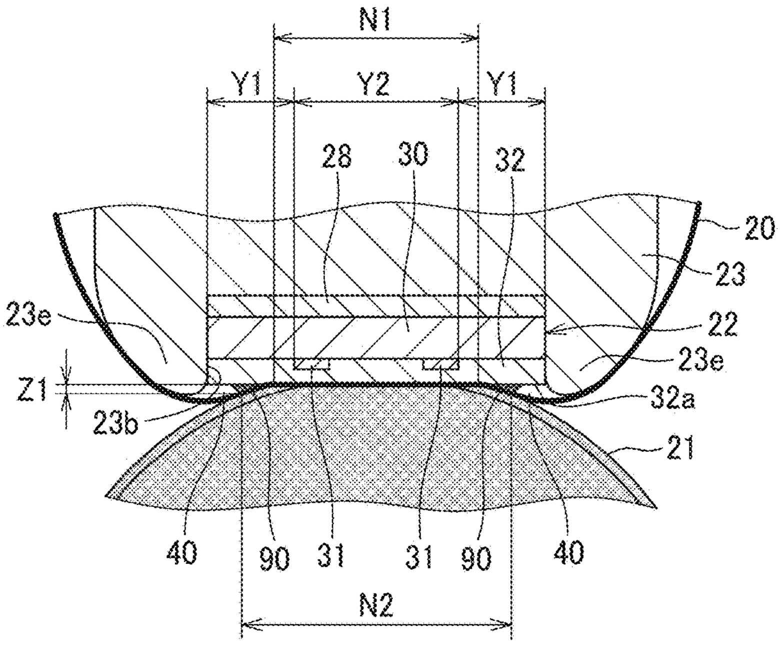
FIG. 9 is a partial sectional view of the fixing device, illustrating a sliding nip and a fixing nip.

As illustrated in FIG. 9, the fixing belt 20 is in contact with the pressure roller 21 in the sheet conveyance direction, which is the lateral direction in FIG. 9, to form the fixing nip N2. The inner circumferential surface of the fixing belt 20 is in contact with the heater 22 in the sheet conveyance direction to form a sliding nip N1.

The sliding nip N1 is a portion in which the sliding surfaces of the heater 22 and the fixing belt 20 are in sliding contact with each other at a certain nip pressure. A specific method of measuring the sliding nip is as follows. The heater 22 is removed from the fixing device 9, and SHINMYOTAN N-RED (manufactured by NAKATANI Co., Ltd.) is applied to the surface of the heater 22. The heater 22 is attached to the fixing device 9, and the fixing belt is pressed against the heater 22 by the pressure roller. The surface temperature of the fixing belt 20 is set to 190° C., and the fixing device 9 is driven for 10 minutes. After that, the fixing device 9 is disassembled to observe the surface of the heater 22. SHINMYOTAN N-RED is peeled off from the sliding nip N1 on the surface of the heater 22. The surface of the heater 22 is photographed. Using a known width of the heater 22 in the short-side direction, portion from which SHINMYOTAN N-RED is peeled off is measured. As a result, the sliding nip N1 is obtained.

In the present embodiment, the width of the sliding nip N1 in the short-side direction is 5.1 mm. On the other hand, the lower limit of the width of the fixing nip N2 is 6.5 mm, which is set by considering errors. The width of the sliding nip N1 is larger than the width Y2 of the heating region in the short-side direction, and the heating region is inside the sliding nip N1. That is, the resistive heat generators 31 are in the sliding nip N1. Specifically, the difference between the width of the sliding nip N1 and the width Y2 of the heating region in the short-side direction is set to 1.3 mm so that the heating region is inside the sliding nip N1 even when a mounting error that is about 0.6 mm and dimensional errors of parts such as the heater 22, the fixing belt 20, the pressure roller 21, and the resistive heat generators 31 in the heater 22 are considered.

The fixing belt 20 may have a different configuration. For example, the fixing belt 20 may have an outer diameter of 25 mm and include the base made of nickel with a thickness of 40 μm, the elastic layer made of silicone rubber with a thickness of 120 μm on the base, and the release layer made of PFA with a thickness of 7 μm as the outermost layer. In the above-described configuration, increasing the lower limit value of the fixing nip N2 to 7.0 mm enables setting the resistive heat generator 31 inside the sliding nip N1.

The above-described fixing device including the heater 22 includes lubricant applied to the inner circumferential surface of the fixing belt 20 and a sliding surface 32*a* on the insulation layer 32 on which the fixing belt slides to reduce sliding friction between the inner circumferential surface of the fixing belt 20 and the insulation layer 32 of the heater 22 and wear of the fixing belt 20 that are caused by the fixing belt 20 rotating and sliding on the heater 22. The lubricant in the present embodiment is, for example, grease such as fluorine grease.

In the present embodiment, the heater holder 23 has a recessed portion 23*b* to hold the heater 22. The heater holder 23 has protruding portions 23*e* on both ends in the sheet conveyance direction. The protruding portion 23*e* protrudes further toward the fixing belt 20 than the insulation layer 32 of the heater 22 held in the recessed portion 23*b* and is in sliding contact with the inner circumferential surface of the fixing belt 20.

The pressure roller 21 presses the fixing belt 20. The fixing belt 20 is pressed against the sliding surface 32*a* of the insulation layer 32. As a result, the inner circumferential surface of the fixing belt 20 comes into contact with a center portion of the sliding surface 32*a* of the insulation layer 32 in the short-side direction of the heater 22 that is a lateral direction in FIG. 9 to form the sliding nip N1. On the other hand, a grease reservoir 40 as a lubricant holding region is formed between the sliding surface 32*a* of the insulation layer 32 and the inner circumferential surface of the fixing belt 20 on each of both end portions of the insulation layer 32 in the short-side direction. Grease is stored in the grease reservoir 40. In particular, grease 90 in the present embodiment is stored adjacent to the sliding nip N1 in the grease reservoir 40. The grease 90 stored in the grease reservoir 40 is supplied little by little to the sliding nip N1, which enables maintaining a good sliding property between the sliding surface 32*a* of the insulation layer 32 and the inner circumferential surface of the fixing belt 20 for a long time.

In order to form a good sliding state between the inner circumferential surface of the fixing belt 20 and the insulation layer 32 of the heater 22, the viscosity and the amount of grease interposed between the sliding surfaces of the fixing belt 20 and the heater 22 are maintained at appropriate values. Too little amount of grease does not form the good sliding state. Too much amount of grease forms too large film thickness of the grease that increases the sliding load and causes and increases the leakage of the grease from the end of the fixing belt 20. If the viscosity of the grease is too high or too low, the good sliding state is not formed. In addition, a grease holding capacity of the sliding surface varies depending on the surface roughness of each of the sliding surfaces of the fixing belt 20 and the heater 22 that hold the grease.

In the present embodiment, the insulation layer 32 of the heater 22 is made of glass and has a smooth surface. A surface roughness Ra is about 0.03 μm in a portion of the insulation layer 32 under which the resistive heat generators 31 and the like are not disposed. When the sliding surface of the insulation layer 32 is smooth as in the present embodiment, the unevenness of the inner circumferential surface of the fixing belt 20 greatly affects the grease holding capacity. In particular, holding PTFE that is thickener of fluorine grease in recesses of the inner circumferential surface of the fixing belt 20 enables supplying the base oil of the fluorine grease to the sliding nip N1 over time, preventing the oil film shortage.

In the present embodiment, the amount of grease supplied is an amount filling the recesses of the inner circumferential surface of the fixing belt 20. Specifically, an application quantity P of grease applied to the inner circumferential surface of the fixing belt 20 is set to satisfy the following expression (2), $$A \times X1 \times B \times C \leq P \tag{2}$$

where A is the height of irregularities on the inner circumferential surface of the fixing belt 20, X1 is the length of the fixing belt 20 in the longitudinal direction, B is the inner circumferential length of the fixing belt 20, and C is the specific gravity of grease. Considering the grease moving to the back side of the heater 22 and the heater holder 23, the amount P of grease is set and satisfies the expression (2).

The height A of irregularities on the inner circumferential surface of the fixing belt 20 as illustrated in an enlarged partial sectional view of the fixing belt 20 is obtained by calculating an average of ten peak-to-peak values of points in a surface profile that is measured by using a laser microscope (VK series manufactured by KEYENCE CORPORATION). The ten peak-to-peak values are measured at ten points on the inner circumferential surface of the fixing belt 20. The ten points are, for example, two points in the circumferential direction at the center position in the longitudinal direction of the fixing belt 20, two points in the circumferential direction at positions separated by ±50 mm from the center position, and two points in the circumferential direction at positions separated by ±100 mm from the center position. Averaging the ten peak-to-peak values of the ten points gives the height A. Specifically, in the present embodiment, the height A of the irregularities is 1.67 μm.

The fixing belt 20 in the present embodiment has an outer diameter of 25 mm and includes the base having a thickness of 60 μm, the elastic layer made of silicone rubber and having a thickness of 250 μm, and the release layer made of PFA and having a thickness of 12 μm. The length X1 of the fixing belt 20 in the longitudinal direction is 234 mm, and the inner circumferential length B is 76.5 mm. The area of the entire inner circumferential surface of the fixing belt 20 is 234×76.5=17901 $mm^2$. The specific gravity C of the fluorine grease is 2.0 $kg/m^3$.

Substituting the above numerical values into the expression (2) yields 0.06 g or more as the application quantity P of the grease applied to the inner surface of the fixing belt. The above-described amount P of the grease enables holding the grease in the recesses of the inner circumferential surface of the fixing belt 20, particularly in the grease reservoir and supplying an appropriate amount of grease between the sliding surface 32*a* of the insulation layer 32 and the inner circumferential surface of the fixing belt 20 over time, thereby preventing oil film shortage.

In addition, the application quantity P of the grease applied is set to be equal to or less than the volume of grease reservoirs formed on the upstream and downstream sides of the sliding nip N1. Applying the grease in an amount larger than the spatial volume of the grease reservoirs may cause disadvantages that are leakage of the grease from the end of the fixing belt 20 and increase in the sliding friction due to an excessive amount of the grease. The grease reservoir is a space between the inner circumferential surface of the fixing belt 20 and the sliding surface 32*a* of the insulation layer 32, which is formed outside the sliding nip N1 and is indicated by a width Y1 in FIG. 9.

The application quantity P of the grease applied is set to satisfy the following expression (3).

$$P \leq Y1 \times 2 \times Z1 \times X1 \times C \tag{3}$$

Where Y1 is a width of the grease reservoir outside the sliding nip N1 in the sheet conveyance direction, and Z1 is a protrusion amount of the protruding portion 23*e* of the heater holder 23, the protruding portion 23*e* protruding from the sliding surface 32*a* of the insulation layer 32. The product of the width Y1×2, the protrusion amount Z1, and the length X1 of the fixing belt 20 in the longitudinal direction in the expression (3) is a volume Dm3 of the grease reservoirs.

As described above, the width of the sliding nip N1 is 5.1 mm, and the width of the heater 22 in the short-side direction that is equal to the width of the base is 8.0 mm. Therefore, the width Y1×2 is 2.9 mm. The height of the protruding portion 23*e* is 1.57 mm. The thicknesses of the first high thermal conduction member 28 is 0.3 mm. The thickness of the heater 22 is 1.07 mm. Therefore, The protrusion amount Z1 is 0.2 mm. The length X1 of the fixing belt 20 in the longitudinal direction is 234 mm. Substituting the above values into the expression 3 gives the volume D of the grease reservoir, that is, D=2.9×0.2×234=135.72 $mm^3$. Multiplying the volume D 135.72 $mm^3$ by the specific gravity of the grease 2.0 $kg/m^3$ gives 0.271 g. Setting the application quantity P of the grease to 0.271 g or less enables preventing the leakage of the grease from the end of the fixing belt 20 and the slip of the fixing belt 20 due to the increase of the initial torque at the start of driving.

The following describes an example of a method for calculating the protrusion amount Z1. First, the heater 22 and the first high thermal conduction member 28 in the fixing device 9 are taken out. The bottom surface of the recessed portion 23*b* is exposed. The bottom surface positions the heater 22 and the first high thermal conduction member 28 that are pressed by the pressure roller 21. Using a height gauge, the height from the bottom surface to an apex of the protruding portion 23*e* that protrudes toward the fixing belt 20 is measured. When the above-described measurement is performed, the bottom surface of the recessed portion 23*b* is horizontally placed. The height is measured on each of the apex of the protruding portion 23*e* upstream from the recessed portion 23*b* and the apex of the protruding portion 23*e* downstream from the recessed portion 23*b* in the sheet conveyance direction, and the average value thereof is calculated. Using a vernier caliper, the thickness of the heater 22 and the thickness of the first high thermal conduction member 28 are measured. Subtracting the thickness of the heater 22 and the thickness of the first high thermal conduction member 28 from the average gives the protrusion amount Z1.

In addition, accommodating the resistive heat generators 31 in the sliding nip N1 enables preventing the grease stored in the grease reservoir outside the sliding nip N1 from being heated and preventing a decrease in the viscosity of the heated grease and volatilization of the fluorine oil due to the heating. As a result, the grease in a good state can be supplied from the grease reservoir 40 to the sliding nip N1, which enables ensuring good slidability between the inner circumferential surface of the fixing belt 20 and the heater 22.

As described above, placing the resistive heat generator 31 in the sliding nip N1 and setting the application quantity of the fluorine grease within the range between the lower limit value and the upper limit value can ensure good slidability between the inner circumferential surface of the fixing belt 20 and the heater 22 for a long period of time.

In particular, the application quantity P of the grease is preferably set to 0.15 g in the present embodiment because this setting enables keeping the application quantity within the range between the lower limit value and the upper limit value described above even if the application quantity has an error of about ±30%.

A preferable lubricant is the fluorine grease as in the embodiment. The fluorine grease enables PTFE as the thickener to secure the viscosity. The lubricant is held between the fixing belt 20 and the heater 22 without causing oil film shortage, and good slidability between the fixing belt 20 and the heater 22 can be secured over a long period of time.

The fixing belt 20 in the present embodiment may include the elastic layer. The elastic layer increases the rigidity of the fixing belt 20, narrowing the sliding nip N1. The outer diameter of the fixing belt 20 may be smaller than the outer diameter of the pressure roller 21 to narrow the sliding nip N1.

The sliding surface 32*a* of the heater 22 preferably has a roughness of 0.05 μm or less. Since the sliding surface 32*a* has a small capacity of retaining grease, the sliding surface 32*a* preferably has a small surface roughness in order to reduce the sliding friction between the sliding surface 32*a* and the inner circumferential surface of the fixing belt 20. The inner circumferential surface of the fixing belt 20 preferably has a surface roughness of 0.5 μm or less. Reducing the surface roughness of the inner circumferential surface of the fixing belt 20 can prevent the grease from being trapped in the irregularities of the inner circumferential surface of the fixing belt 20 and not being supplied between the inner circumferential surface of the fixing belt 20 and the heater 22.

The above-described surface roughness is measured as an arithmetic average roughness using a surface roughness meter SURFCOM 1400A (manufactured by TOKYO SEIMITSU CO., LTD.) in accordance with JIS B0601-2001 under the following measurement conditions. The evaluation length Ln is 1.5 mm, the reference length L is 0.25 mm, and a cut-off value is 0.8 mm.

In order to improve the quality of the fixing operation and to extend the life of the fixing device, the rigidity of the fixing belt 20 is increased by thickening the base of the fixing belt 20, using a metal base, thickening the elastic layer, or the like. On the other hand, increasing the rigidity of the fixing belt 20 reduces a deformation amount of the fixing belt 20 due to the pressure applied by the pressure roller 21, which reduces the sliding nip N2 with respect to the fixing nip N1. Alternatively, reducing the outer diameter of the fixing belt 20 or reducing the outer diameter of the pressure roller 21 with respect to the outer diameter of the fixing belt 20 reduces the sliding nip N1 with respect to the fixing nip N2.

The following describes results of experiments regarding the relationship between the sliding nip N1 and the fixing nip N2. In the experiments, two types of fixing devices were used.

A first type of fixing device had a first configuration as follows. The fixing belt 20 had an outer diameter of 25 mm and included the base made of polyimide and having a thickness of 60 μm, the elastic layer made of silicone rubber and having a thickness of 250 μm, and the release layer made of PFA and having a thickness of 12 μm as the outermost layer. The pressure roller 21 had an outer diameter of 20 mm and included the core, the elastic layer made of silicone rubber and having a thickness of 3.5 mm, and a release layer made of PFA and having a thickness of 50 μm as the outermost layer.

A second type of fixing device had a second configuration as follows. The fixing belt 20 had an outer diameter of 25 mm and included the base made of nickel and having a thickness of 40 μm, the elastic layer made of silicone rubber and having a thickness of 120 μm, and the release layer made of PFA and having a thickness of 7 μm as the outermost layer. The pressure roller 21 in the second configuration was the same as that in the first configuration.

Figure 10:
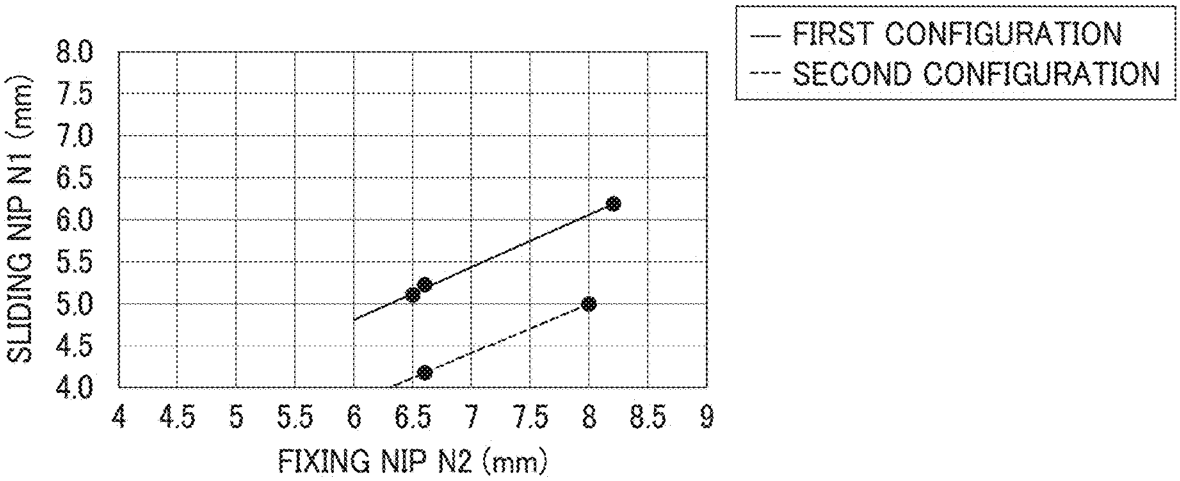
FIG. 10 is a graph illustrating a relationship between the sliding nip and the fixing nip.

In the above-described fixing devices having the first configuration and the second configuration, changing the value of the axial hardness (Asker C) of the pressure roller 21 changed the sliding nip N1 and the fixing nip N2. The width of the sliding nip N1 in the sheet conveyance direction and the width of the fixing nip N2 in the sheet conveyance direction were measured. FIG. 10 is a graph illustrating results of the measurements of the widths of the sliding nip N1 and the fixing nip N2. The solid line in FIG. 10 indicates the results of the measurements in the first configuration, and the dotted line in FIG. 10 indicates the results of the measurements in the second configuration.

The width of the fixing nip N2 was measured as follows. First, the surface temperature of the fixing belt 20 of the fixing device 9 was set to 190° C., and the fixing belt 20 was driven for 5 minutes or more. An overhead projector (OHP) sheet was conveyed to the fixing nip N2, and the fixing device 9 was stopped before the fixing belt 20 made one round after the leading edge of the OHP sheet entered the fixing nip N2. As a result, the OHP sheet was nipped by the fixing nip N2. After 20 seconds had passed, the OHP sheet was taken out. The nip trace on the OHP sheet was accurately measured with a vernier caliper to measure the fixing nip N2 in the fixing device 9.

As illustrated in FIG. 10, the width of the sliding nip N1 in the first configuration was smaller than the width of the fixing nip N2 by about 1.4 mm to 2.0 mm in a range of the width of the fixing nip N2 from 6.5 mm to 8.0 mm. In contrast, the width of the sliding nip N1 in the second configuration was smaller than the width of the fixing nip N2 by about 2.4 mm to 3.0 mm. As described above, the width of the sliding nip N1 in the second configuration including the fixing belt 20 that includes the base made of nickel having high rigidity was narrower than the width of the sliding nip N1 in the first configuration.

The resistive heat generator 31 disposed outside the sliding nip N1 increases temperatures of the heater 22 outside the sliding nip N1, causing a decrease in the viscosity of the grease in the grease reservoir and volatilization of the fluorine oil. In order to increase the sliding nip N1, the second configuration including the fixing belt with the high rigidity needs to increase the fixing nip N2. In other words, the widths of the fixing nip N2 and the sliding nip N1 needs to be plotted at a point at an upper right position in the graph illustrated in FIG. 10. To avoid an increase in the size and driving torque of the fixing device, the fixing belt in the first configuration is preferable.

Figure 11:
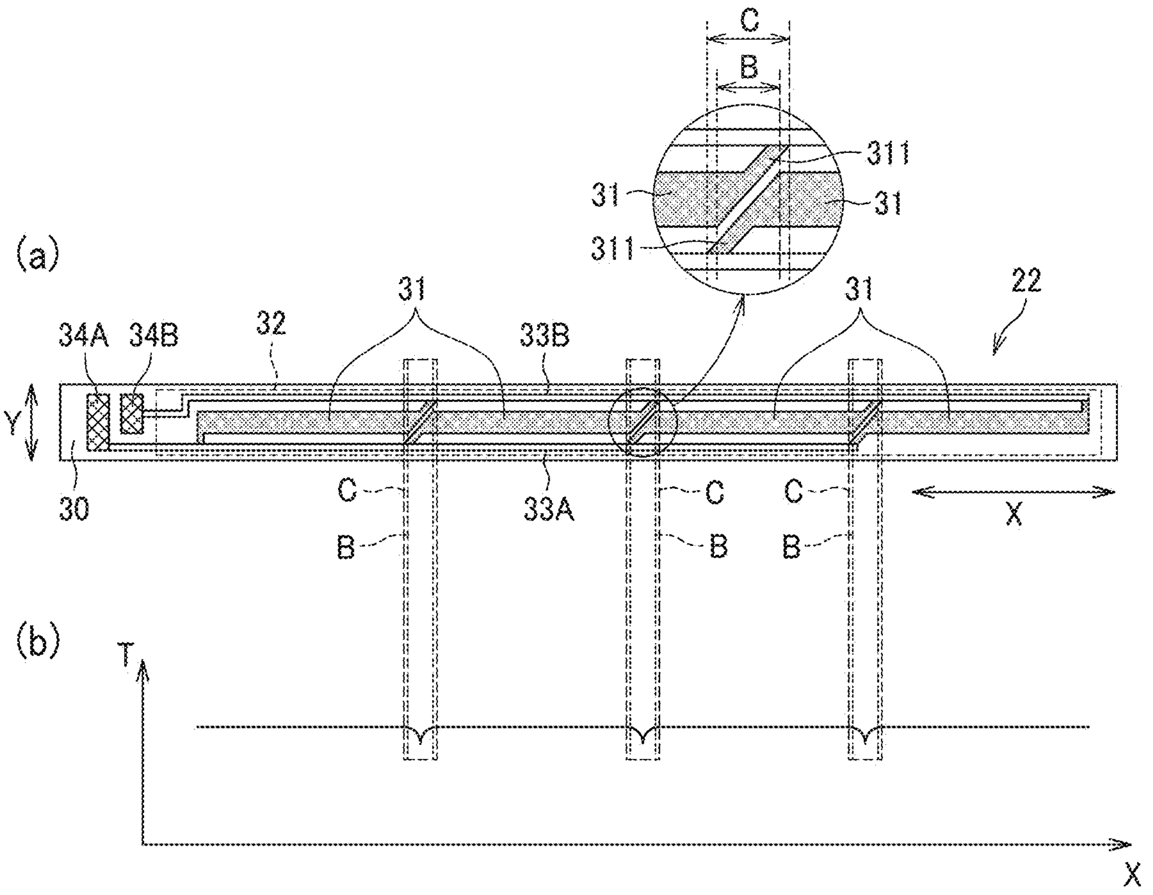
FIG. 11 is a diagram illustrating a temperature distribution of the fixing belt in an arrangement direction of the resistive heat generators of the heater, including (a) a plan view of the heater and (b) a graph illustrating the temperature distribution of the fixing belt.

FIG. 11 is a diagram illustrating a temperature distribution of a fixing belt in the longitudinal direction of the fixing belt 20, including (a) a plan view of the heater and (b) a graph illustrating the temperature distribution of the fixing belt 20. FIG. 11 (*a*) illustrates the arrangement of the resistive heat generators 31 of the heater 22. In the graph of FIG. 11 (*b*), a vertical axis represents the temperature T of the fixing belt 20, and a horizontal axis represents the position of the fixing belt 20 in the longitudinal direction.

As illustrated in FIG. 11 (*a*), the plurality of resistive heat generators 31 of the heater 22 are separated from each other in the longitudinal direction to form separation areas B including gap areas between the neighboring resistive heat generators 31.

In other words, the heater 22 has gap areas between the plurality of resistive heat generators 31. As illustrated in an enlarged view of FIG. 11 (*a*), the separation area B includes the entire gap area sandwiched by the adjoining resistive heat generators 31. In addition, the separation area B includes parts of the resistive heat generators sandwiched between lines extending in a direction orthogonal to the longitudinal direction from both ends of the gap area in the longitudinal direction. The area occupied by the resistive heat generators 31 in the separation area B is smaller than the area occupied by the resistive heat generators 31 in another area of the heat generation portion 35, and the amount of heat generated in the separation area B is smaller than the amount of heat generated in another area of the heat generation portion. As a result, the temperature of the fixing belt 20 corresponding to the separation area B becomes smaller than the temperature of the fixing belt 20 corresponding to another area, which causes temperature unevenness in the longitudinal direction of the fixing belt 20 as illustrated in FIG. 11 (*b*). Similarly, the temperature of the heater 22 corresponding to the separation area B becomes smaller than the temperature of the heater 22 corresponding to another area of the heat generation portion 35. In addition to the separation area B, the heater 22 has an enlarged separation area C including areas corresponding to connection portions 311 of the resistive heat generators 31 and the separation area B as illustrated in the enlarged view of FIG. 11 (*a*). The connection portion 311 is defined as a portion of the resistive heat generator 31 that extends in the short-side direction and is connected to one of the power supply lines 33A and 33B. Similar to the separation area B, the temperature of the heater 22 corresponding to the enlarged separation area C and the temperature of the fixing belt 20 corresponding to the enlarged separation area C are smaller than the temperatures of the heater 22 and the fixing belt 20 corresponding to another area of the heat generation portion 35.

Figure 12:
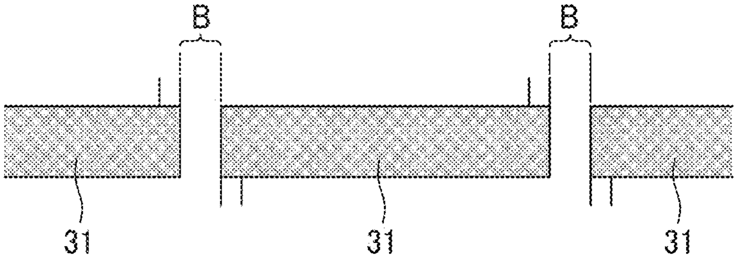
FIG. 12 is a diagram illustrating separation areas of the heater of FIG. 5.
Figure 13:
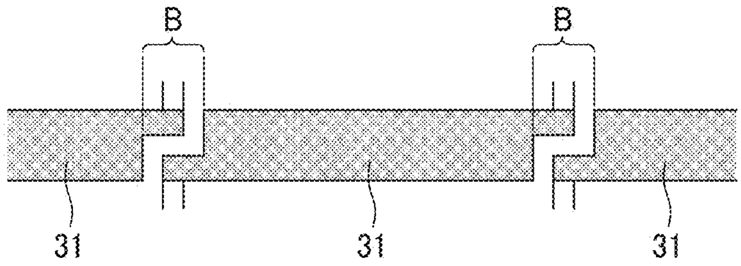
FIG. 13 is a diagram illustrating separation areas each having a form different from the form of the separation area of FIG. 12.
Figure 14:
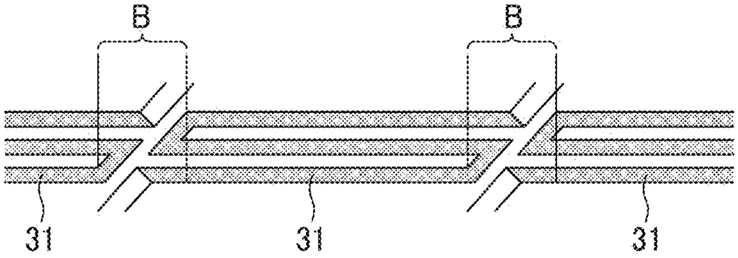
FIG. 14 is a diagram illustrating separation areas of the heater of FIG. 6.

As illustrated in FIG. 12, the heater 22 including the rectangular resistive heat generators 31 illustrated in FIG. 5 also has the separation areas B having lower temperatures than another area of the heat generation portion 35. In addition, the heater 22 including the resistive heat generators 31 having forms as illustrated in FIG. 13 has the separation areas B with lower temperatures than another area of the heat generation portion 35. As illustrated in FIG. 14, the heater 22 including the resistive heat generators 31 having forms as illustrated in FIG. 6 has the separation areas B with lower temperatures than another area of the heat generation portion 35. However, overlapping the resistive heat generators 31 lying next to each other in the longitudinal direction as illustrated in FIGS. 11, 13, and 14 can reduce the above-described temperature drop that the temperature of the fixing belt 20 corresponding to the separation area B is smaller than the temperature of the fixing belt 20 corresponding to an area other than the separation area B.

The fixing device 9 in the present embodiment includes the first high thermal conduction member 28 described above in order to reduce the temperature drop corresponding to the separation area B as described above and reduce the temperature unevenness in the longitudinal direction of the fixing belt 20. Next, a detailed description is given of the first high thermal conduction member 28.

As illustrated in FIG. 2, the first high thermal conduction member 28 is disposed between the heater 22 and the stay 24 in the lateral direction of FIG. 2 and is particularly sandwiched between the heater 22 and the heater holder 23. One side of the first high thermal conduction member 28 is brought into contact with the back surface of the base 30, and the other side of the first high thermal conduction member 28 is brought into contact with the heater holder 23.

The stay 24 has two rectangular portions **24*a* extending in a thickness direction of the heater 22 and each having a contact surface 24*a*1 that contacts the back side of the heater holder 23 to support the heater holder 23, the first high thermal conduction member 28, and the heater 22. In the short-side direction that is the vertical direction in FIG. 2, the contact surfaces 24*a*1 are outside the resistive heat generators 31. The above-described structure prevents heat transfer from the heater 22 to the stay 24 and enables the heater 22 to effectively heat the fixing belt 20**.

Figure 15:
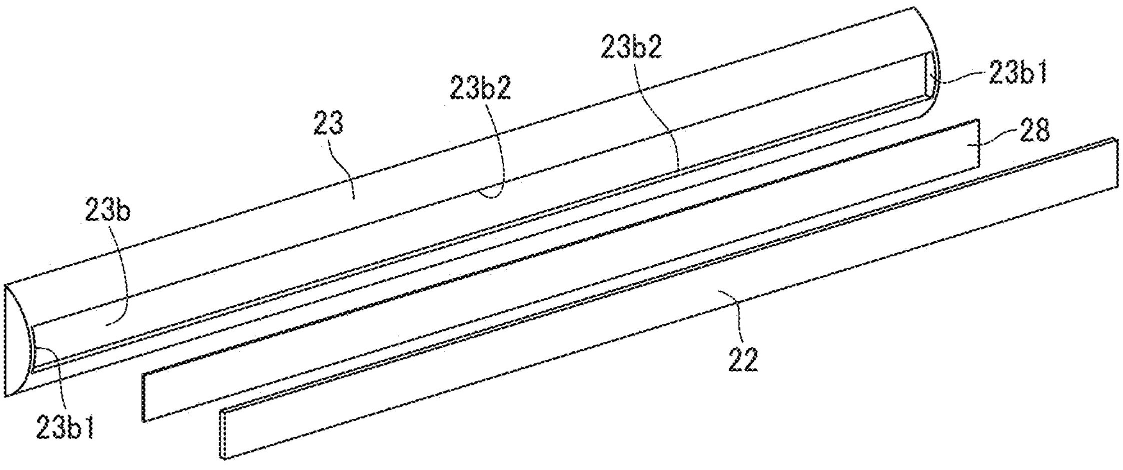
FIG. 15 is a perspective view of the heater, the first high thermal conduction member, and a heater holder.

As illustrated in FIG. 15, the first high thermal conduction member 28 is a plate. In the present embodiment, the first high thermal conduction member 28 is made of a single plate but may be made of a plurality of members.

In FIG. 15, the guide 26 in FIG. 2 is omitted.

The first high thermal conduction member 28 is fitted into the recessed portion **23*b* of the heater holder 23, and the heater 22 is mounted thereon. Thus, the first high thermal conduction member 28 is sandwiched and held between the heater holder 23 and the heater 22. In the present embodiment, the length of the first high thermal conduction member 28 in the longitudinal direction is substantially the same as the length of the heater 22 in the longitudinal direction. Both side walls 23*b*1 forming the recessed portion 23*b* in the longitudinal direction restrict movement of the heater 22 and movement of the first high thermal conduction member 28 in the longitudinal direction and work as longitudinal direction regulators. Reducing the positional deviation of the first high thermal conduction member 28 in the longitudinal direction in the fixing device 9 improves the thermal conductivity efficiency with respect to a target range in the longitudinal direction. In addition, both side walls 23*b*2 forming the recessed portion 23*b* in the short-side direction restricts movement of the heater 22 and movement of the first high thermal conduction member 28** in the short-side direction and work as short-side direction regulators.

Figure 16:
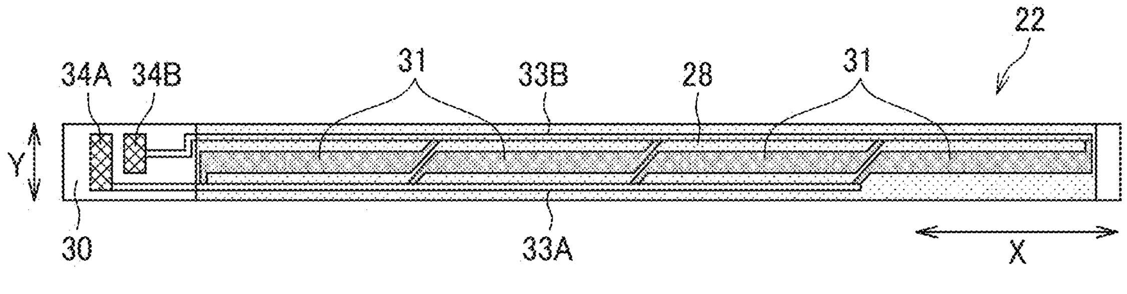
FIG. 16 is a plan view of the heater to illustrate a setting of the first high thermal conduction member.
Figure 17:
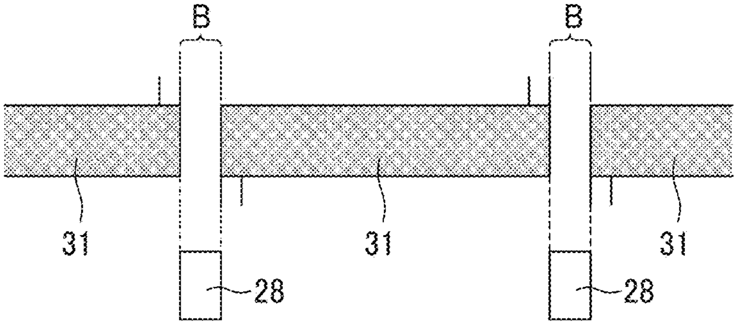
FIG. 17 is a schematic diagram illustrating another example of the setting of the first high thermal conduction members in the heater.
Figure 18:
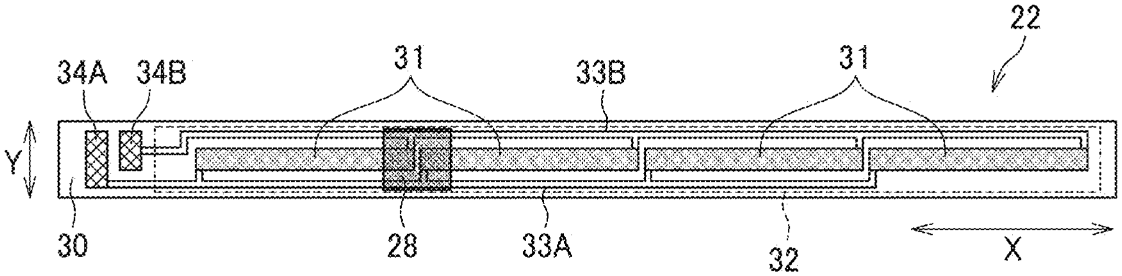
FIG. 18 is a plan view of the heater having a further different setting of the first high thermal conduction member.

The range in which the first high thermal conduction member 28 is disposed in the longitudinal direction is not limited to the above. For example, as illustrated in FIG. 16, the first high thermal conduction member 28 may be disposed so as to face a range corresponding to the heat generation portion 35 in the longitudinal direction (see a hatched portion in FIG. 16). As illustrated in FIG. 17, the first high thermal conduction member 28 may face the entire gap area between the resistive heat generators 31. In FIG. 17, for the sake of convenience, the resistive heat generator 31 and the first high thermal conduction member 28 are shifted in the vertical direction of FIG. 17 but are disposed at substantially the same position in the short-side direction. However, the present disclosure is not limited to the above. The first high thermal conduction member 28 may be disposed to face a part of the resistive heat generators 31 in the short-side direction or may be disposed so as to cover the entire resistive heat generators 31 in the short-side direction as illustrated in FIG. 18, which is described below. As illustrated in FIG. 18, the first high thermal conduction member 28 may be face a part of each of the neighboring resistive heat generators 31 in addition to the gap area between the neighboring resistive heat generators 31. The first high thermal conduction member 28 may be disposed to face all separation areas B in the heater 22, one separation area B as illustrated in FIG. 18, or some of separation areas B. At least a part of the first high thermal conduction member 28 may be disposed to face the separation area B.

Due to the pressing force of the pressure roller 21, the first high thermal conduction member 28 is sandwiched between the heater 22 and the heater holder 23 and is brought into close contact with the heater 22 and the heater holder 23. Bringing the first high thermal conduction member 28 into contact with the heaters 22 improves the heat conduction efficiency in the longitudinal direction of the heaters 22. The first high thermal conduction member 28 facing the separation area B improves the heat conduction efficiency of a part of the heater 22 facing the separation area B in the longitudinal direction, transmits heat to the part of the heater 22 facing the separation area B, and raises the temperature of the part of the heater 22 facing the separation area B. As a result, the first high thermal conduction member 28 reduces the temperature unevenness in the longitudinal direction of the heaters 22. Thus, temperature unevenness in the longitudinal direction of the fixing belt 20 is reduced. Therefore, the above-described structure prevents fixing unevenness and gloss unevenness in the image fixed on the sheet. Since the heater 22 does not need to generate additional heat to secure sufficient fixing performance in the part of the heater 22 facing the separation area B, energy consumption of the fixing device 9 can be saved. The first high thermal conduction member 28 disposed over the entire area of the heat generation portion 35 in the longitudinal direction improves the heat transfer efficiency of the heater 22 over the entire area of a main heating region of the heater 22, that is, an area facing an image formation area of the sheet passing through the fixing device and reduces the temperature unevenness of the heater 22 and the temperature unevenness of the fixing belt 20 in the longitudinal direction.

In the present embodiment, the combination of the first high thermal conduction member 28 and the resistive heat generator 31 having the PTC characteristic described above efficiently prevents overheating the non-sheet passing region (that is the region of the fixing belt outside the small sheet) of the fixing belt 20 when small sheets pass through the fixing device 9. Specifically, the PTC characteristic reduces the amount of heat generated by the resistive heat generator 31 in the non-sheet passing region, and the first high thermal conduction member effectively transfers heat from the non-sheet passing region in which the temperature rises to a sheet passing region that is a region of the fixing belt contacting the sheet. As a result, the overheating of the non-sheet passing region is effectively prevented.

The first high thermal conduction member 28 may be disposed opposite an area around the separation area B because the small heat generation amount in the separation area B decreases the temperature in the area around the separation area B. For example, the first high thermal conduction member 28 facing the enlarged separation area C (see FIG. 11 (*a*)) particularly improves the heat transfer efficiency of the separation area B and the area around the separation area B in the longitudinal direction and reduces the temperature unevenness of the heater 22 in the longitudinal direction. In particular, the first high thermal conduction member 28 facing the entire region of the heat generation portion 35 in the longitudinal direction reduces the temperature unevenness of the heater 22 (and the fixing belt 20) in the longitudinal direction.

Next, different embodiments of the fixing device are described.

Figure 19:
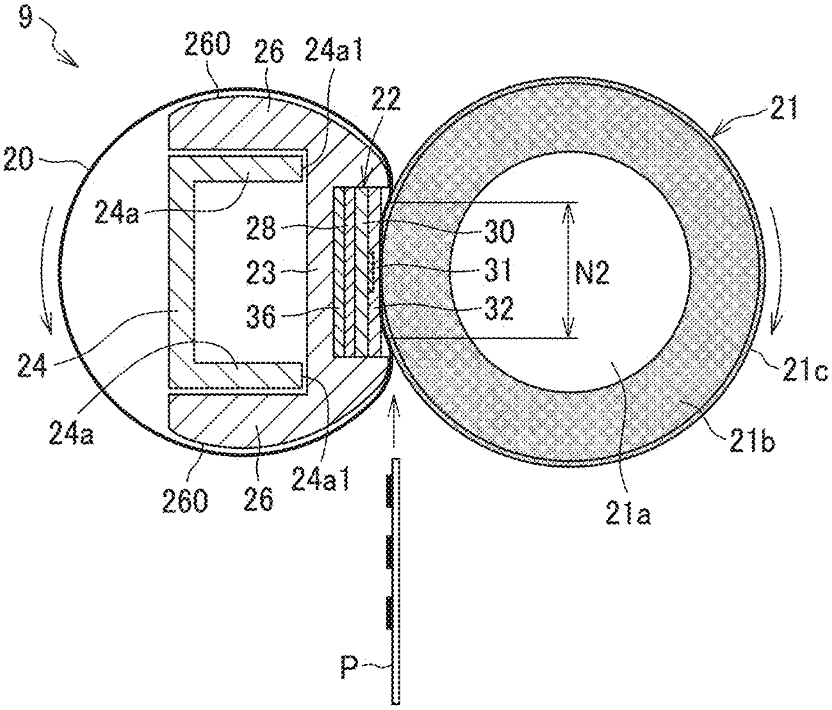
FIG. 19 is a schematic sectional side view of the fixing device according to an embodiment different from the embodiment illustrated in FIG. 2.

As illustrated in FIG. 19, the fixing device 9 according to the present embodiment includes a second high thermal conduction member 36 between the heater holder 23 and the first high thermal conduction member 28. The second high thermal conduction member 36 is disposed at a position different from the position of the first high thermal conduction member 28 in the lateral direction in FIG. 19 that is a direction in which the heater holder 23, the stay 24, and the first high thermal conduction member 28 are layered. Specifically, the second high thermal conduction member 36 is disposed so as to overlap the first high thermal conduction member 28. FIG. 19 illustrates a schematic cross section of the fixing device 9 including the second high thermal conduction member 36 that transmits heat in the longitudinal direction, and the position of the schematic cross section is different from the position of the thermistor 25 illustrated in FIG. 2.

The second high thermal conduction member 36 is made of a material having thermal conductivity higher than the thermal conductivity of the base 30, for example, graphene or graphite. In the present embodiment, the second high thermal conduction member 36 is made of a graphite sheet having a thickness of 1 mm. Alternatively, the second high thermal conduction member 36 may be a plate made of aluminum, copper, silver, or the like.

Figure 20:
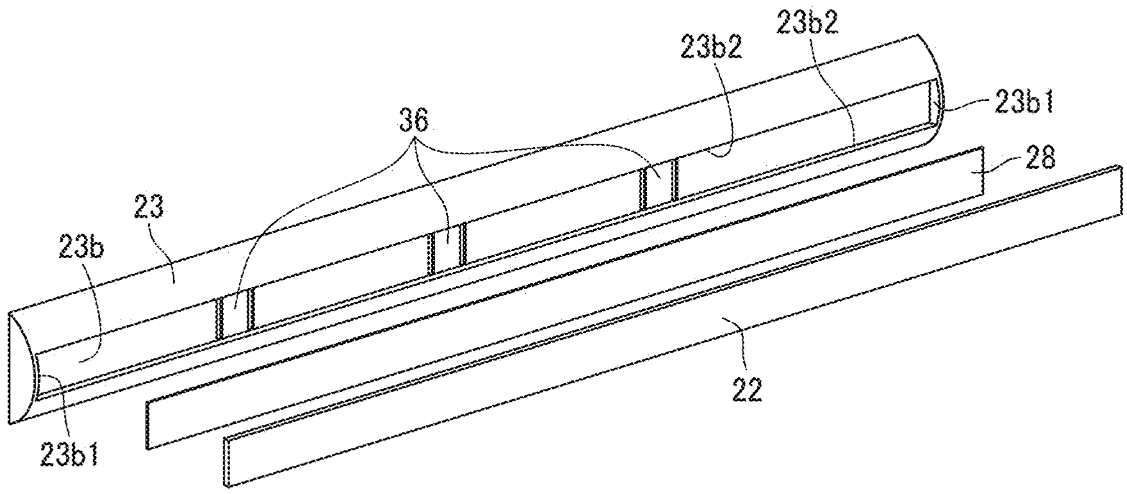
FIG. 20 is a perspective view of the heater, the first high thermal conduction member, a second high thermal conduction member, and the heater holder.

As illustrated in FIG. 20, a plurality of the second high thermal conduction members 36 are disposed on a plurality of portions of the heater holder 23 in the longitudinal direction. The recessed portion **23*b* of the heater holder 23 has a plurality of holes in which the second high thermal conduction members 36 are disposed. Clearances are formed between the heater holder 23 and both sides of the second high thermal conduction member 36 in the longitudinal direction. The clearance prevents heat transfer from the second high thermal conduction member 36 to the heater holder 23, and the heater 22 can efficiently heat the fixing belt 20. In FIG. 20, the guide 26 in FIG. 2** is omitted.

Figure 21:
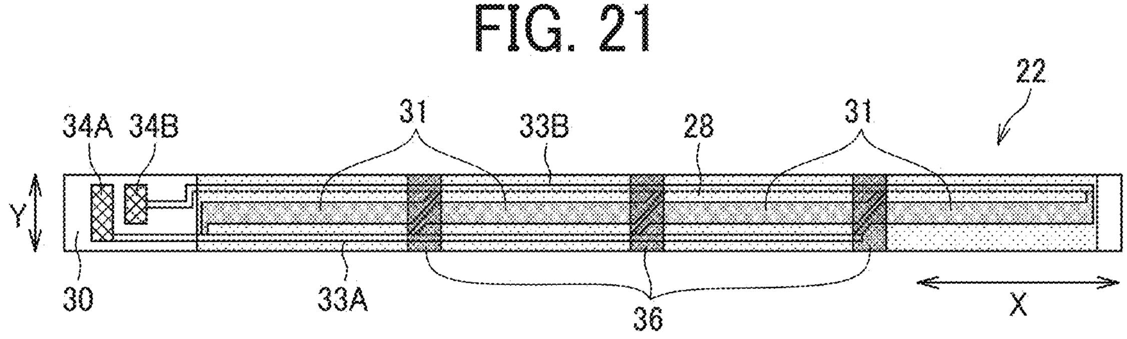
FIG. 21 is a plan view of the heater to illustrate an arrangement of the first high thermal conduction member and the second high thermal conduction member.

As illustrated in FIG. 21, each of the second high thermal conduction members 36 (see the hatched portions) is disposed at a position corresponding to the separation area B in the longitudinal direction and faces at least a part of each of the neighboring resistive heat generators 31 in the longitudinal direction. In particular, each of the second high thermal conduction members 36 in the present embodiment faces the entire separation area B. In FIG. 21 (and FIG. 25 to be described later), the first high thermal conduction member 28 faces the heat generation portion 35 extending in the longitudinal direction, but the first high thermal conduction member 28 according to the present embodiment is not limited this as described above.

Figure 22:
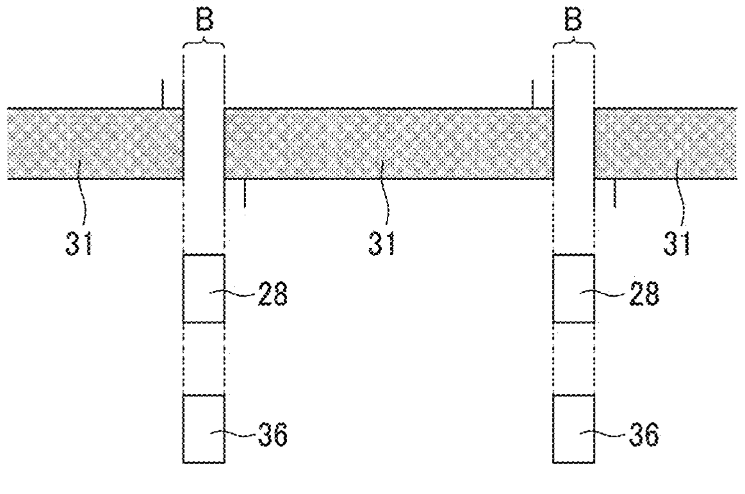
FIG. 22 is a schematic diagram illustrating a different arrangement of the first high thermal conduction members and the second high thermal conduction members from the arrangement in FIG. 21.

The fixing device 9 according to the present embodiment includes the second high thermal conduction member 36 disposed at the position corresponding to the separation area B in the longitudinal direction and the position at which at least a part of each of the neighboring resistive heat generators 31 faces the second high thermal conduction member 36 in addition to the first high thermal conduction member 28. The above-described structure particularly improves the heat transfer efficiency in the separation area B in the longitudinal direction and further reduces the temperature unevenness of the heater 22 in the longitudinal direction. As illustrated in FIG. 22, the first high thermal conduction members 28 and the second high thermal conduction member 36 may be disposed opposite the entire gap area between the resistive heat generators 31. The above-described structure improves the heat transfer efficiency of the part of the heater 22 corresponding to the gap area to be higher than the heat transfer efficiency of the other part of the heater 22. In FIG. 22, for the sake of convenience, the resistive heat generator 31, the first high thermal conduction member 28, and the second high thermal conduction member 36 are shifted in the vertical direction of FIG. 22 but are disposed at substantially the same position in the short-side direction. However, the present disclosure is not limited to the above. The first high thermal conduction member 28 and the second high thermal conduction member 36 may be disposed opposite a part of the resistive heat generators 31 in the short-side direction or may be disposed so as to cover the entire resistive heat generators 31 in the short-side direction.

In one embodiment different from the embodiments described above, each of the first high thermal conduction member 28 and the second high thermal conduction member 36 is made of a graphene sheet. The first high thermal conduction member 28 and the second high thermal conduction member 36 made of the graphene sheet have high thermal conductivity in a predetermined direction along the plane of the graphene, that is, not in the thickness direction but in the longitudinal direction. Accordingly, the above-described structure can effectively reduce the temperature unevenness of the fixing belt 20 in the longitudinal direction and the temperature unevenness of the heater 22 in the longitudinal direction.

Figure 23:
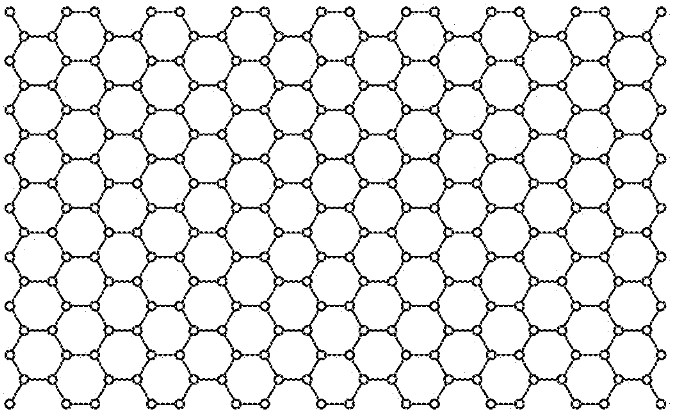
FIG. 23 is a schematic diagram illustrating a two-dimensional atomic crystal structure of graphene.

Graphene is a flaky powder. Graphene has a planar hexagonal lattice structure of carbon atoms, as illustrated in FIG. 23. The graphene sheet is usually a single layer. The single layer of carbon may contain impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described later are measured by, for example, a transmission electron microscope (TEM).

Figure 24:
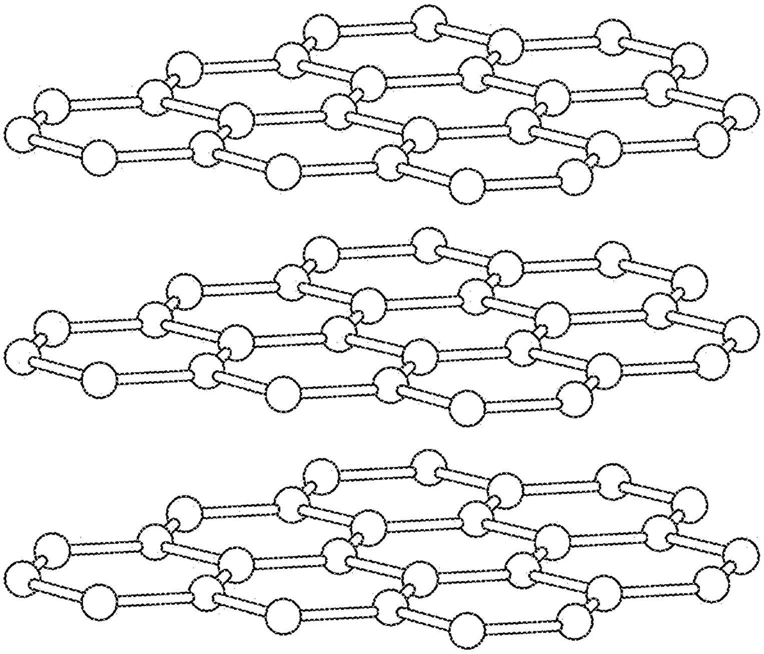
FIG. 24 is a schematic diagram illustrating a three-dimensional atomic crystal structure of graphite.

Graphite obtained by multilayering graphene has a large thermal conduction anisotropy. As illustrated in FIG. 24, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 28 and the second high thermal conduction member 36 that are made of graphite each have the heat transfer efficiency in the longitudinal direction larger than the heat transfer efficiency in the thickness direction of the first high thermal conduction member 28 and the second high thermal conduction member 36 (that is, the stacking direction of these members), reducing the heat transferred to the heater holder 23. Accordingly, the above-described structure can efficiently decrease the temperature unevenness of the heater 22 in the longitudinal direction and can minimize the heat transferred to the heater holder 23. Since the first high thermal conduction member 28 and the second high thermal conduction member 36 that are made of graphite are not oxidized at about 700 degrees or lower, the first high thermal conduction member 28 and the second high thermal conduction member 36 each have an excellent heat resistance.

The physical properties and dimensions of the graphite sheet may be appropriately changed according to the function required for the first high thermal conduction member 28 or the second high thermal conduction member 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first high thermal conduction member 28 or a width of the second high thermal conduction member 36 may be increased in response to a large width of the fixing nip N2 or a large width of the heater 22.

From the viewpoint of increasing mechanical strength, the number of layers of the graphite sheet is preferably 11 or more. The graphite sheet may partially include a single layer portion and a multilayer portion.

Figure 25:
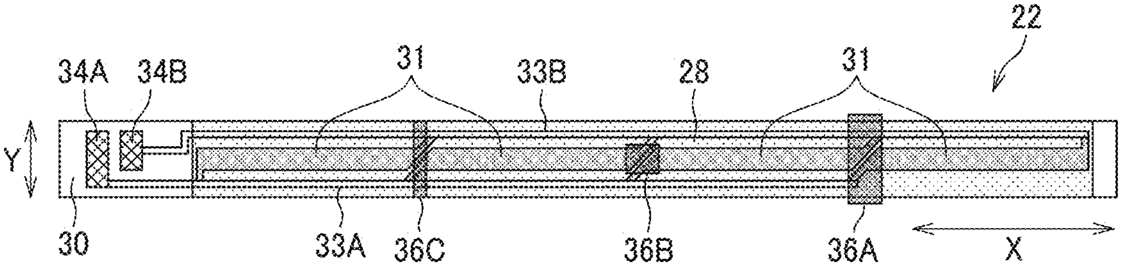
FIG. 25 is a plan view of the heater having a different arrangement of the second high thermal conduction member from the arrangement in FIG. 21.

As long as the second high thermal conduction member 36 faces a part of each of neighboring resistive heat generators 31 and at least a part of the gap area between the neighboring resistive heat generators 31, the configuration of the second high thermal conduction member 36 is not limited to the configuration illustrated in FIG. 21. For example, as illustrated in FIG. 25, a second high thermal conduction member 36A is longer than the base 30 in the short-side direction, and both ends of the second high thermal conduction member 36A in the short-side direction are outside the base 30 in FIG. 25. A second high thermal conduction member 36B faces a range in which the resistive heat generator 31 is disposed in the short-side direction. A second high thermal conduction member 36C faces a part of the gap area and a part of each of neighboring resistive heat generators 31.

Figure 26:
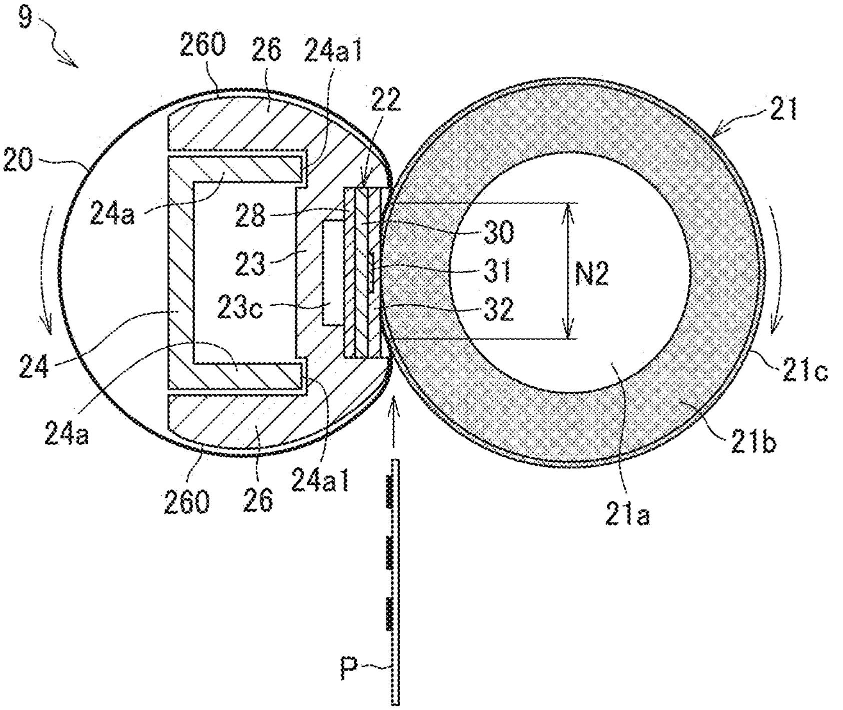
FIG. 26 is a schematic sectional side view of the fixing device different from the fixing devices of FIGS. 2 and 19.

As illustrated in FIG. 26, the fixing device according to the present embodiment has a gap between the first high thermal conduction member 28 and the heater holder 23 in the thickness direction that is the lateral direction in FIG. 26. In other words, the fixing device 9 has a gap 23*c* serving as a thermal insulation layer. In the longitudinal direction, the gap 23*c* is in a portion included in the recessed portion 23*b* (see FIG. 20) in the heater holder 23 to set the heater 22, the first high thermal conduction member 28, and the second high thermal conduction member 36, but the second high thermal conduction member 36 is not set in the portion of the gap 23*c*. In the short-side direction, the gap 23*c* is in a portion of the recessed portion 23*b* having a depth deeper than other portions to receive the first high thermal conduction member 28. The above-described structure minimizes the contact area between the heater holder 23 and the first high thermal conduction member 28. Minimizing the contact area prevents heat transfer from the first high thermal conduction member 28 to the heater holder 23 and enables the heater 22 to efficiently heat the fixing belt 20. In the cross section of the fixing device 9 in which the second high thermal conduction member 36 is set, the second high thermal conduction member 36 is in contact with the heater holder 23 as illustrated in FIG. 19 of the above-described embodiment.

In particular, the fixing device 9 according to the present embodiment has the gap 23*c* facing the entire area of the resistive heat generators 31 in the short-side direction that is the vertical direction in FIG. 26. The gap 23*c* prevents heat transfer from the first high thermal conduction member 28 to the heater holder 23, and the heater 22 can efficiently heat the fixing belt 20. The fixing device 9 may include a thermal insulation layer made of heat insulator having a lower thermal conductivity than the thermal conductivity of the heater holder 23 instead of a space like the gap 23*c* serving as the thermal insulation layer.

In the above description, the second high thermal conduction member 36 is a member different from the first high thermal conduction member 28, but the present embodiment is not limited to this. For example, the first high thermal conduction member 28 may have a thicker portion than the other portion so that the thicker portion faces the separation area B.

Similar to the embodiment illustrated in FIG. 2, disposing the resistive heat generator 31 in the sliding nip N1 and appropriately setting the application quantity of the lubricant in the fixing devices according to the embodiments illustrated in FIGS. 19 and 26 can also obtain good slidability between the fixing belt 20 and the heater 22.

Figure 27:
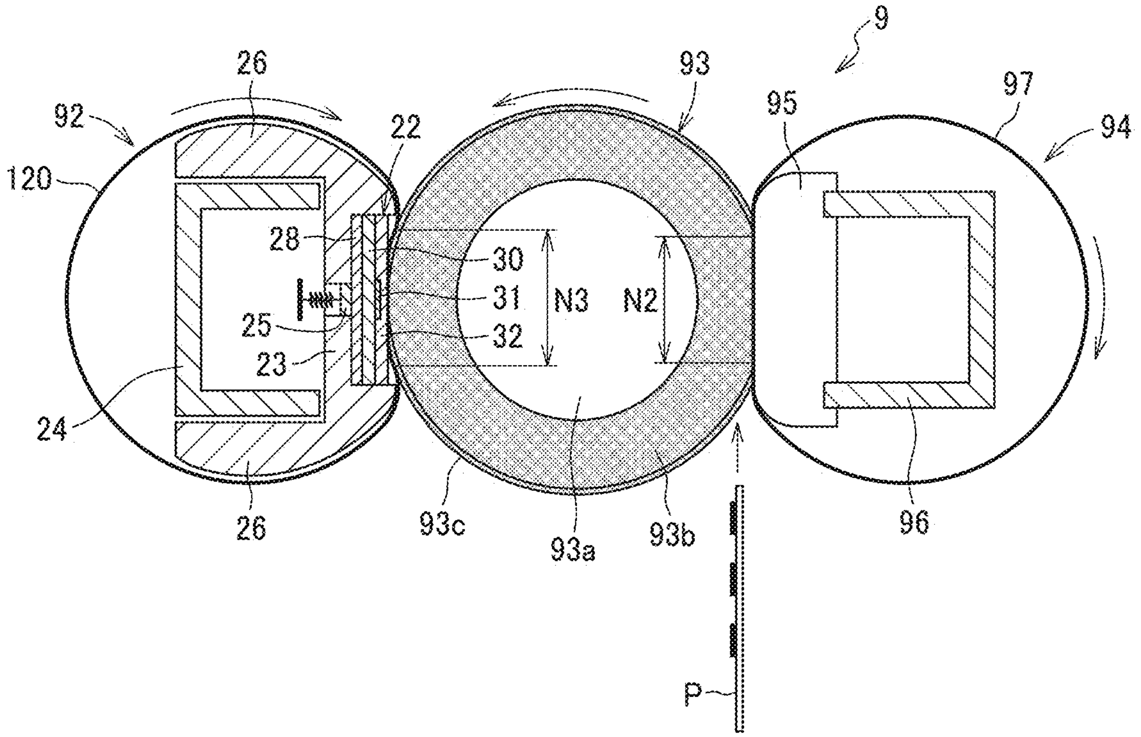
FIG. 27 is a sectional side view of a schematic configuration of a fixing device different from the fixing devices of FIGS. 2, 19, and 26.

The embodiments of the present disclosure are also applicable to the fixing devices as illustrated in FIG. 27 other than the fixing devices described above. The following describes the fixing device 9 illustrated in FIG. 27.

As illustrated in FIG. 27, the fixing device 9 includes a heating assembly 92, a fixing roller 93 that is a fixing rotator, and a pressure assembly 94 that is a facing member. The heating assembly 92 includes the heater 22, the first high thermal conduction member 28, the heater holder 23, the stay 24, which are described in the above embodiments, and a heating belt 120 as the rotator. The fixing roller 93 is a pressure rotator that presses the heating belt 120 to form a heating nip N3 between the fixing roller 93 and the heating belt 120. The fixing roller 93 includes a core 93*a*, an elastic layer 93*b*, and a surface layer 93*c*. The pressure assembly 94 is opposite to the heating assembly 92 with respect to the fixing roller 93. The pressure assembly 94 includes a nip formation pad 95 and a stay 96 inside the loop of a pressure belt 97, and the pressure belt 97 is rotatably arranged to wrap around the nip formation pad 95 and the stay 96. The sheet P passes through the fixing nip N2 between the pressure belt 97 and the fixing roller 93 to be heated and pressed to fix the image onto the sheet P.

Similar to the above-described embodiments, disposing the resistive heat generator 31 in the sliding nip N1 and appropriately setting the application quantity of the lubricant in the fixing devices according to the embodiment illustrated in FIG. 27 can also obtain the good slidability between the fixing belt 20 and the heater 22. In addition, disposing the resistive heat generator 31 in the sliding nip N1 and appropriately setting the application quantity of the lubricant in the fixing devices according to the embodiment illustrated in FIG. 27 can also obtain the good slidability between the heating belt 120 and the heater 22.

The present disclosure is not limited to applying the fixing device described in the above embodiments. The present disclosure may be applied to, for example, a heating device such as a dryer to dry ink applied to the sheet, a coating device (a laminator) that heats, under pressure, a film serving as a covering member onto the surface of the sheet such as paper, and a thermocompression device such as a heat sealer that seals a seal portion of a packaging material with heat and pressure. Applying the present disclosure to each of the above-described device can provide the good sliding state between the rotator and the heater.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

Figure 28:
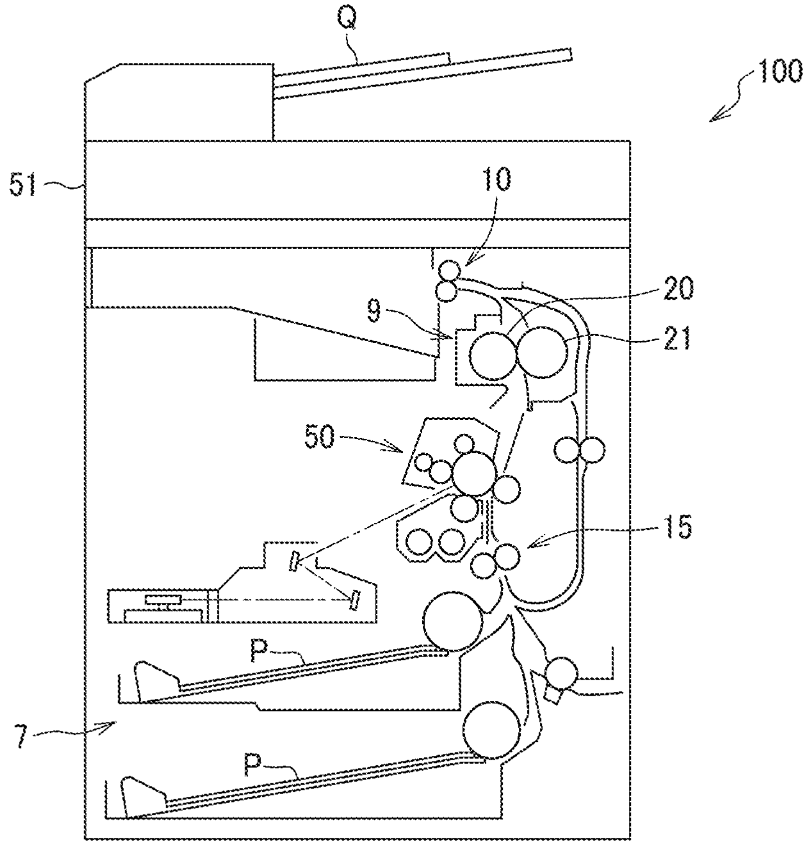
FIG. 28 is a schematic sectional view of an image forming apparatus different from the image forming apparatus of FIG. 1.

For example, as illustrated in FIG. 28, the image forming apparatus 100 according to the present embodiment includes an image forming device 50 including a photoconductor drum and the like, the sheet conveyer including the timing roller pair 15 and the like, the sheet feeder 7, the fixing device 9, the sheet ejection device 10, and a reading device 51. The sheet feeder 7 includes the plurality of sheet feeding trays, and the sheet feeding trays stores sheets of different sizes, respectively.

The reading device 51 reads an image of a document Q. The reading device 51 generates image data from the read image. The sheet feeder 7 stores the plurality of sheets P and feeds the sheet P to the conveyance path. The timing roller pair 15 conveys the sheet P on the conveyance path to the image forming device 50.

The image forming device 50 forms a toner image on the sheet P. Specifically, the image forming device 50 includes the photoconductor drum, a charging roller, the exposure device, the developing device, a supply device, a transfer roller, the cleaning device, and a discharging device. The toner image is, for example, an image of the document Q. The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100.

Next, the fixing device 9 of the present embodiment is described. Description of configurations common to those of the fixing devices of the above-described embodiments is omitted as appropriate.

Figure 29:
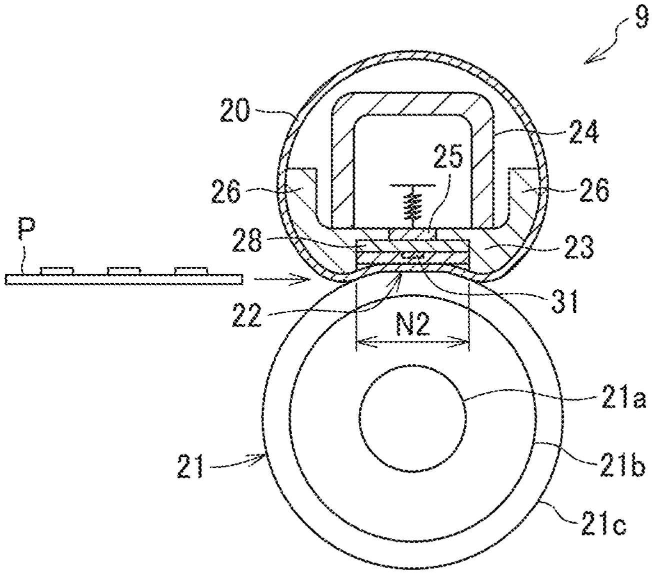
FIG. 29 is a schematic sectional side view of the fixing device according to an embodiment of the present disclosure.

As illustrated in FIG. 29, the fixing device 9 includes the fixing belt 20, the pressure roller 21, the heater 22, the heater holder 23, the stay 24, the thermistors 25, and the first high thermal conduction member 28.

The fixing nip N2 is formed between the fixing belt 20 and the pressure roller 21. The nip width of the fixing nip N2 is 10 mm, and the linear velocity of the fixing device 9 is 240 mm/S.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the core 21*a*, the elastic layer 21*b*, and the surface layer 21*c*. The pressure roller 21 has an outer diameter of 24 to 30 mm, and the elastic layer 21*b* has a thickness of 3 to 4 mm.

The heater 22 includes the base, the thermal insulation layer, the conductor layer including the resistive heat generator and the like, and the insulation layer, and is formed to have a thickness of 1 mm as a whole. The width Y of the heater 22 in the short-side direction is 13 mm.

Figure 30:
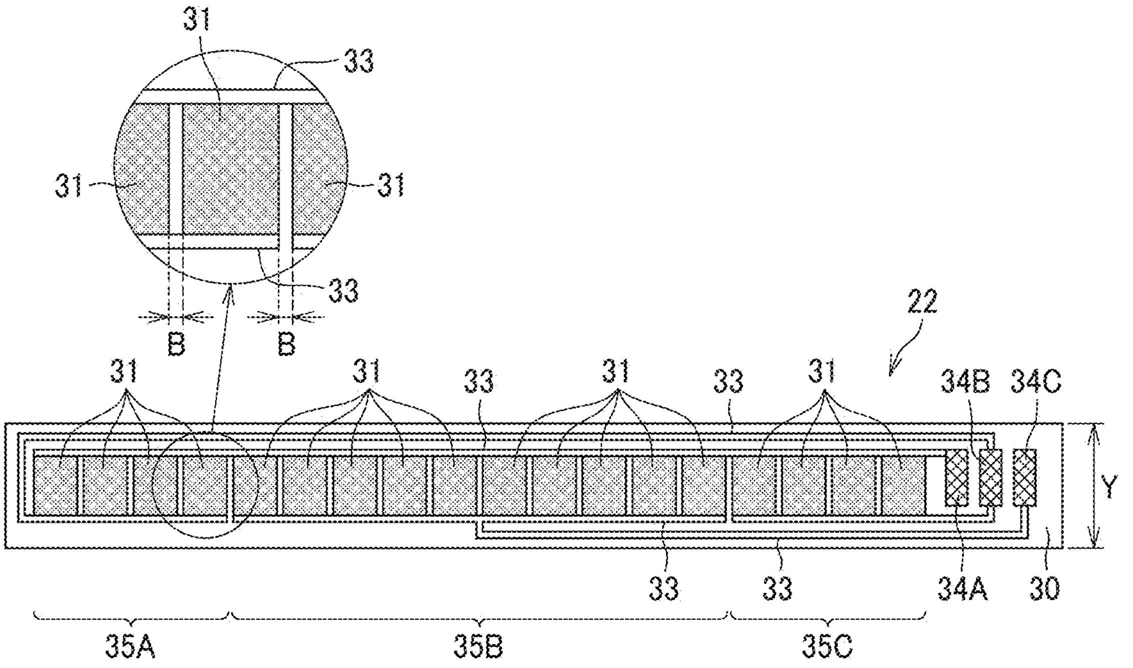
FIG. 30 is a plan view of the heater in the fixing device of FIG. 29.

As illustrated in FIG. 30, the conductor layer of the heater 22 includes a plurality of resistive heat generators 31, power supply lines 33, and electrodes 34A to 34C. As illustrated in the enlarged view of FIG. 30, the separation area B is also formed in the present embodiment between neighboring resistive heat generators of the plurality of resistive heat generators 31 arranged in the longitudinal direction. The enlarged view of FIG. 30 illustrates two separation areas B, but the separation area B is formed between neighboring resistive heat generators of all the plurality of resistive heat generators 31. The resistive heat generators 31 configure three heat generation portions 35A to 35C. When a current flows between the electrodes 34A and 34B, the heat generation portions 35A and 35C generate heat. When a current flows between the electrodes 34A and 34C, the heat generation portion 35B generates heat. When the fixing device 9 fixes the toner image onto the small sheet, the heat generation portion 35B generates heat. When the fixing device 9 fixes the toner image onto the large sheet, all the heat generation portions 35A to 35C generate heat.

Figure 31:
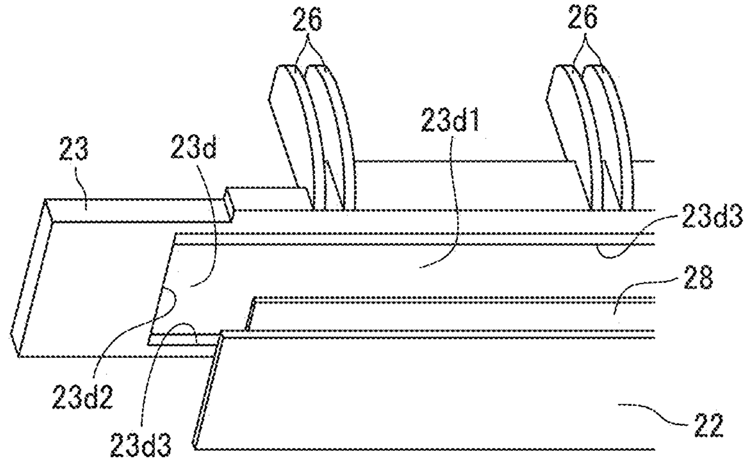
FIG. 31 is a partial perspective view of the heater and the heater holder in the fixing device of FIG. 29.

As illustrated in FIG. 31, the heater holder 23 holds the heater 22 and the first high thermal conduction member 28 in a recessed portion 23*d*. The recessed portion 23*d* is formed on the side of the heater holder 23 facing the heater 22. The recessed portion 23*d* has a bottom surface 23*d*1 and walls 23*d*2 and 23*d*3. The bottom surface 23*d*1 is substantially parallel to the base 30 and the surface recessed from the side of the heater holder 23 toward the stay 24. The walls 23*d*2 are both side surfaces of the recessed portion 23*d* in the longitudinal direction. The recessed portion 23*d* may have one wall 23*d*2. The walls 23*d*3 are both side surfaces of the recessed portion 23*d* in the short-side direction. The heater holder 23 has guides 26. The heater holder 23 is made of LCP.

Figure 32:
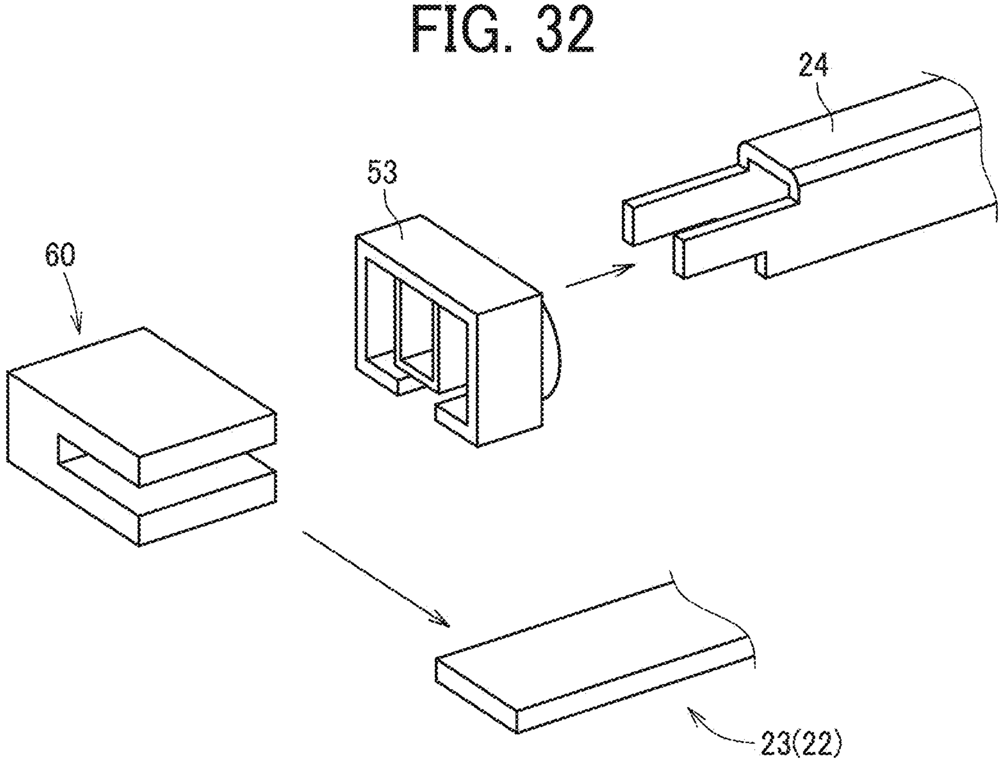
FIG. 32 is a perspective view of a connector attached to the heater.

As illustrated in FIG. 32, a connector 60 includes a housing made of resin such as LCP and a plurality of contact terminals fixed to the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively and the heat generation portions 35 are electrically coupled to the power supply provided in the image forming apparatus via the connector 60. The above-described configuration enables the power supply to supply power to the heat generation portions 35. Note that at least a part of each of the electrodes 34A to 34C is not coated by the insulation layer and therefore exposed to secure connection with the connector 60.

A flange 53 contacts the inner circumferential surface of the fixing belt 20 at each of both ends of the fixing belt 20 in the longitudinal direction to hold the fixing belt 20. The flange 53 is fixed to the housing of the fixing device 9. The flange 53 is inserted into each of both ends of the stay 24 (see an arrow direction from the flange 53 in FIG. 32).

To attach to the heater 22 and the heater holder 23, the connector 60 is moved in the short-side direction (see a direction indicated by an arrow from the connector 60 in FIG. 32). The connector 60 and the heater holder 23 may have a convex portion and a recessed portion to attach the connector 60 to the heater holder 23. The convex portion disposed on one of the connector 60 and the heater holder 23 is engaged with the recessed portion disposed on the other and relatively move in the recessed portion to attach the connector 60 to the heater holder 23. The connector 60 is attached to one end of the heater 22 and one end of the heater holder 23 in the longitudinal direction. The one end of the heater 22 and the one end of the heater holder 23 are farther from a portion in which the pressure roller 21 receives a driving force from a drive motor than the other end of the heater 22 and the other end of the heater holder 23, respectively.

Figure 33:
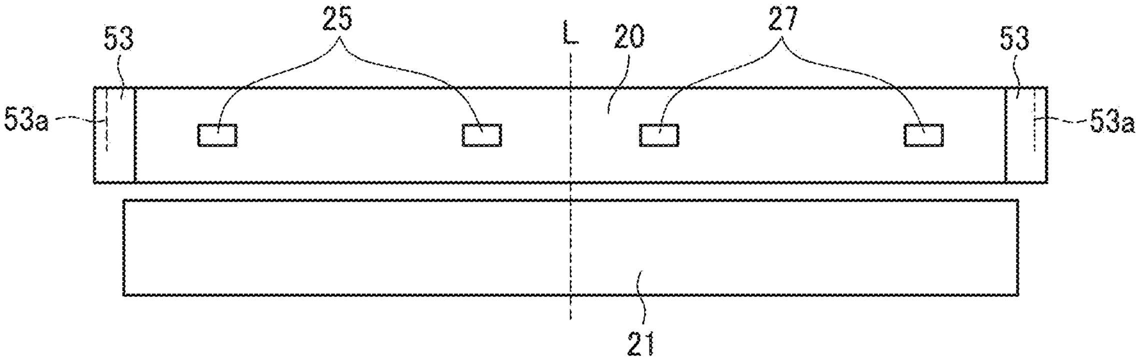
FIG. 33 is a schematic diagram illustrating an arrangement of thermistors and thermostats.

As illustrated in FIG. 33, one thermistor 25 faces a center portion of the inner circumferential surface of the fixing belt 20 in the longitudinal direction, and another thermistor 25 faces an end portion of the inner circumferential surface of the fixing belt 20 in the longitudinal direction. The heater 22 is controlled based on the temperature of the center portion of the fixing belt 20 and the temperature of the end portion of the fixing belt 20 in the longitudinal direction that are detected by the thermistors 25.

As illustrated in FIG. 33, one thermostat 27 faces a center portion of the inner circumferential surface of the fixing belt 20 in the longitudinal direction, and another thermostat 27 faces an end portion of the inner circumferential surface of the fixing belt 20 in the longitudinal direction. Each of the thermostats 27 shuts off a current to the heater 22 in response to a detection of a temperature of the fixing belt 20 higher than a predetermined threshold value.

Flanges 53 are disposed at both ends of the fixing belt 20 in the longitudinal direction and hold both ends of the fixing belt 20, respectively. The flange 53 is made of LCP.

Figure 34:
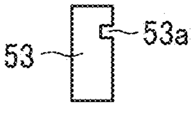
FIG. 34 is a schematic diagram illustrating a groove of a flange.

As illustrated in FIG. 34, the flange 53 has a slide groove 53*a*. The slide groove 53*a* extends in a direction in which the fixing belt 20 moves toward and away from the pressure roller 21. An engaging portion of the housing of the fixing device 9 is engaged with the slide groove 53*a*. The relative movement of the engaging portion in the slide groove 53*a* enables the fixing belt 20 to move toward and away from the pressure roller 21.

Similar to the above-described embodiments, disposing the resistive heat generator 31 in the sliding nip N1 and appropriately setting the application quantity of the lubricant in the above-described fixing device 9 can also obtain the good slidability between the fixing belt 20 and the heater 22.

The above-described embodiments are illustrative and do not limit this disclosure. It is therefore to be understood that within the scope of the appended claims, numerous additional modifications and variations are possible to this disclosure otherwise than as specifically described herein.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

The recording medium P may be a sheet of plain paper, thick paper, thin paper, a postcard, an envelope, coated paper, art paper, tracing paper, overhead projector (OHP) sheet, plastic film, prepreg, copper foil, or the like.

Aspects of the present disclosure are, for example, as follows.

In a first aspect, a heating device includes a rotator, a pressure rotator, a heater, a holder, and lubricant. The pressure rotator forms an outer surface nip between the rotator and the pressure rotator. The heater is disposed inside a loop of the rotator and forms a sliding nip between an inner circumferential surface of the rotator and the heater. The heater includes a base and a resistive heat generator disposed inside the sliding nip in a recording medium conveyance direction. The holder has a recessed portion to hold the heater. The lubricant is applied to the inner circumferential surface of the rotator and a sliding surface of the heater on which the rotator slides. The lubricant is held in a lubricant holding region outside the sliding nip in the recording medium conveyance direction and between the rotator and the heater. An application quantity P of the lubricant satisfies the following expression.

$$A \times X1 \times B \times C \leq P \leq D \times C$$

where A is a height of irregularities on the inner circumferential surface of the rotator, X1 is a length of the rotator in the longitudinal direction, B is a circumferential length of the rotator, C is a specific weight of the lubricant, and D is a volume of the lubricant holding region.

In a second aspect, the lubricant in the heating device according to the first aspect is fluorine grease.

In a third aspect, the rotator in the heating device according to the first aspect or the second aspect includes an elastic layer.

In a fourth aspect, the heating device according to any one of the first to third aspects includes the rotator having an outer diameter larger than an outer diameter of the pressure rotator.

In a fifth aspect, the sliding surface of the heater in the heating device according to any one of the first to fourth aspects has a surface roughness of 0.05 μm or less.

In a sixth aspect, the inner circumferential surface of the rotator in the heating device according to any one of the first to fifth aspects has a surface roughness of 0.5 μm or less.

In a seventh aspect, a fixing device includes the heating device according to any one of first to sixth aspects that heats an image on a recording medium to fix the image on the recording medium.

In an eighth aspect, an image forming apparatus includes an image forming device to form an image on a recording medium and the fixing device according to the seventh aspect.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Applications No. 2022-032745, filed on Mar. 3, 2022, and No. 2022-089587, filed on Jun. 1, 2022, in the Japan Patent Office, the entire disclosure of which are hereby incorporated by reference herein.

REFERENCE SIGNS LIST

1 Image forming apparatus
9 Fixing device (Heating device)
20 Fixing belt (Fixing rotator)
21 Pressure roller (Pressure rotator)
22 Heater (Heating body)
23 Heater holder (Holder)
**23*b*** Recessed portion
30 Base
31 Resistive heat generator
32 Insulation layer
40 Grease reservoir (Lubricant holding region)
90 Fluorine grease (Lubricant)
A Sheet conveyance direction (Recording medium conveyance direction)
N1 Sliding nip
N2 Fixing nip (Outer surface nip)
X Longitudinal direction
Y Short-side direction (Recording medium conveyance direction)

The invention claimed is:

1. A heating device comprising:
a tubular rotator;
a pressure rotator configured to form an outer surface nip between the tubular rotator and the pressure rotator;
a heater inside a loop of the tubular rotator, the heater configured to form a sliding nip between an inner circumferential surface of the tubular rotator and the heater, the heater including,
a base, and
a resistive heat generator inside the sliding nip in a recording medium conveyance direction;
a holder having a recessed portion configured to hold the heater; and
at least one lubricant reservoir configured to,
store lubricant, and
supply the lubricant to the inner circumferential surface of the tubular rotator and a sliding surface of the heater on which the tubular rotator slides, the at least one lubricant reservoir adjacent to the sliding nip and between the holder, the heater, and the inner circumferential surface of the tubular rotator,
wherein the pressure rotator is further configured to press the tubular rotator toward the heater,
the sliding nip is configured to gradually receive the lubricant from the at least one lubricant reservoir in response to rotation of the tubular rotator and the pressure rotator, and the lubricant has an application quantity P satisfying the following expression:

$$A \times X1 \times B \times C \leq P \leq D \times C$$

where A is a height of irregularities on the inner circumferential surface of the tubular rotator, X1 is a length of the tubular rotator in a longitudinal direction of the tubular rotator, B is a circumferential length of the tubular rotator, C is a specific weight of the lubricant, and D is a volume of the at least one lubricant reservoir.

2. The heating device according to claim 1, wherein the lubricant is fluorine grease.

3. The heating device according to claim 1, wherein the tubular rotator includes an elastic layer.

4. The heating device according to claim 1, wherein an outer diameter of the tubular rotator is larger than an outer diameter of the pressure rotator.

5. The heating device according to claim 1, wherein the sliding surface of the heater has a surface roughness of 0.05 μm or less.

6. The heating device according to claim 1, wherein the inner circumferential surface of the tubular rotator has a surface roughness of 0.5 μm or less.

7. A fixing device comprising:

a heating device, the heating device configured to heat an image on a recording medium to fix the image on the recording medium; and a tubular rotator;

a pressure rotator configured to form an outer surface nip between the tubular rotator and the pressure rotator;

a heater inside a loop of the tubular rotator, the heater configured to form a sliding nip between an inner circumferential surface of the tubular rotator and the heater, the heater including, a base, and a resistive heat generator inside the sliding nip in a recording medium conveyance direction;

a holder having a recessed portion configured to hold the heater; and at least one lubricant reservoir configured to, store lubricant, and supply the lubricant to the inner circumferential surface of the tubular rotator and a sliding surface of the heater on which the tubular rotator slides, the at least one lubricant reservoir adjacent to the sliding nip and between the holder, the heater, and the inner circumferential surface of the tubular rotator, wherein the pressure rotator is further configured to press the tubular rotator toward the heater, the sliding nip is configured to gradually receive the lubricant from the at least one lubricant reservoir in response to rotation of the tubular rotator and the pressure rotator, and the lubricant has an application quantity P satisfying the following expression:

$$A \times X1 \times B \times C \leq P \leq D \times C$$

where A is a height of irregularities on the inner circumferential surface of the tubular rotator, X1 is a length of the tubular rotator in a longitudinal direction of the tubular rotator, B is a circumferential length of the tubular rotator, C is a specific weight of the lubricant, and D is a volume of the at least one lubricant reservoir.

8. An image forming apparatus comprising:

an image forming device configured to form an image on a recording medium; and a fixing device, the fixing device including, a tubular rotator;

a pressure rotator configured to form an outer surface nip between the tubular rotator and the pressure rotator;

a heater inside a loop of the tubular rotator, the heater configured to form a sliding nip between an inner circumferential surface of the tubular rotator and the heater, the heater including, a base, and a resistive heat generator inside the sliding nip in a recording medium conveyance direction;

a holder having a recessed portion configured to hold the heater; and at least one lubricant reservoir configured to, store lubricant, and supply the lubricant to the inner circumferential surface of the tubular rotator and a sliding surface of the heater on which the tubular rotator slides, the at least one lubricant reservoir adjacent to the sliding nip and between the holder, the heater, and the inner circumferential surface of the tubular rotator, wherein the pressure rotator is further configured to press the tubular rotator toward the heater, the sliding nip is configured to gradually receive the lubricant from the at least one lubricant reservoir in response to rotation of the tubular rotator and the pressure rotator, and the lubricant has an application quantity P satisfying the following expression:

$$A \times X1 \times B \times C \leq P \leq D \times C$$

where A is a height of irregularities on the inner circumferential surface of the tubular rotator, X1 is a length of the tubular rotator in a longitudinal direction of the tubular rotator, B is a circumferential length of the tubular rotator, C is a specific weight of the lubricant, and D is a volume of the at least one lubricant reservoir.

9. The fixing device according to claim 7, wherein the lubricant is fluorine grease.

10. The fixing device according to claim 7, wherein the tubular rotator includes an elastic layer.

11. The fixing device according to claim 7, wherein an outer diameter of the tubular rotator is larger than an outer diameter of the pressure rotator.

12. The fixing device according to claim 7, wherein the sliding surface of the heater has a surface roughness of 0.05 μm or less.

13. The fixing device according to claim 7, wherein the inner circumferential surface of the tubular rotator has a surface roughness of 0.5 μm or less.

14. The image forming apparatus according to claim 8, wherein the lubricant is fluorine grease.

15. The image forming apparatus according to claim 8, wherein the tubular rotator includes an elastic layer.

16. The image forming apparatus according to claim 8, wherein an outer diameter of the tubular rotator is larger than an outer diameter of the pressure rotator.

17. The image forming apparatus according to claim 8, wherein the sliding surface of the heater has a surface roughness of 0.05 μm or less.

18. The image forming apparatus according to claim 8, wherein the inner circumferential surface of the tubular rotator has a surface roughness of 0.5 μm or less.

19. The heating device according to claim 1, wherein the heater further includes an insulation layer including the sliding surface;

the sliding surface is configured to be in contact with the inner circumferential surface of the tubular rotator; and the at leeast one lubricant reservoir is further configured to supply the lubricant to the sliding surface.

20. The heating device according to claim 19, wherein the holder further includes:

a plurality of protrusion portions, each of the plurality of protrusion portions extending further towards the tubular rotator than the insulation layer.

* * * * *